United States Patent [19]

Harpell et al.

[11] Patent Number: 5,316,820
[45] Date of Patent: May 31, 1994

[54] FLEXIBLE COMPOSITES HAVING FLEXING RIGID PANELS AND ARTICLES FABRICATED FROM SAME

[75] Inventors: Gary A. Harpell; Dusan C. Prevorsek, both of Morristown, N.J.

[73] Assignee: AlliedSignal Inc., Morris Township, Morris County, N.J.

[21] Appl. No.: 72,646

[22] Filed: Jun. 7, 1993

Related U.S. Application Data

[63] Continuation of Ser. No. 705,679, May 24, 1991, abandoned.

[51] Int. Cl.$^5$ .................................................. B32B 5/12
[52] U.S. Cl. .................................... 428/109; 428/102; 428/105; 428/113; 428/114; 428/246; 428/251; 428/252; 428/285; 428/294; 428/902; 428/911
[58] Field of Search ............. 428/102, 105, 109, 113, 428/114, 246, 251, 252, 285, 294, 902, 911

[56] References Cited

U.S. PATENT DOCUMENTS

| | | | |
|---|---|---|---|
| 3,867,239 | 2/1975 | Alesi et al. | 428/911 |
| 4,241,457 | 12/1980 | Klein | 428/911 |
| 4,356,569 | 11/1982 | Sullivan | 428/911 |
| 4,403,012 | 9/1983 | Harpell et al. | 428/911 |
| 4,413,110 | 11/1983 | Kavesh et al. | 428/911 |
| 4,443,506 | 4/1984 | Schmolmann | 428/911 |
| 4,457,985 | 7/1984 | Harpell et al. | 428/911 |
| 4,472,472 | 9/1984 | Schultz | 428/911 |
| 4,483,020 | 11/1984 | Dunn | 428/911 |
| 4,543,286 | 9/1985 | Harpell et al. | 428/911 |
| 4,559,251 | 12/1985 | Wachi | 428/911 |
| 4,608,717 | 9/1986 | Dunbavand | 428/911 |
| 4,613,535 | 9/1986 | Harpell et al. | 428/911 |
| 4,623,574 | 11/1986 | Harpell et al. | 428/911 |
| 4,650,710 | 3/1987 | Harpell et al. | 428/911 |
| 4,660,223 | 4/1987 | Fritch | 428/911 |
| 4,681,792 | 7/1987 | Harpell et al. | 428/911 |
| 4,704,943 | 11/1987 | McDougal | 428/911 |
| 4,737,401 | 4/1988 | Harpell et al. | 428/911 |
| 4,737,402 | 4/1988 | Harpell et al. | 428/911 |
| 4,810,559 | 3/1989 | Fortier et al. | 428/196 |
| 4,916,000 | 4/1990 | Li et al. | 428/911 |
| 4,923,741 | 5/1990 | Kosmo et al. | 428/911 |
| 5,087,516 | 2/1992 | Groves | 428/911 |
| 5,110,661 | 5/1992 | Groves | 428/911 |

FOREIGN PATENT DOCUMENTS 2219379  12/1989  United Kingdom .
WO91/07632  5/1991  World Int. Prop. O. .

OTHER PUBLICATIONS

J. Macromol. Sci.-Chem., A7(1), pp. 295-322 (1973), R. C. Liable and F. Figucia.

Primary Examiner—James J. Bell
Attorney, Agent, or Firm—Gus T. Hampilos

[57] ABSTRACT

A flexible article of manufacture especially suitable for use as a ballistic resistant body armor which comprises at least one substrate, said layers being a fibrous layer, and at least one layer having a plurality of bodies sewn to at least one surface of said substrate layer, said bodies having one or more flexible seams which allow portions of said body to flex along said seam.

41 Claims, 12 Drawing Sheets

FIG. 24A
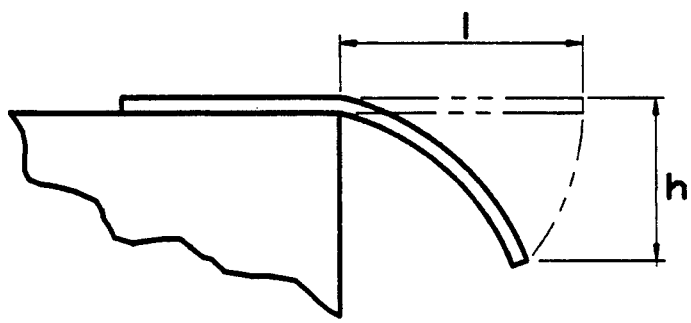
FIG. 24B
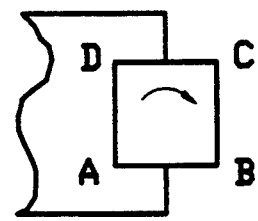
FIG. 25A  FIG. 25B
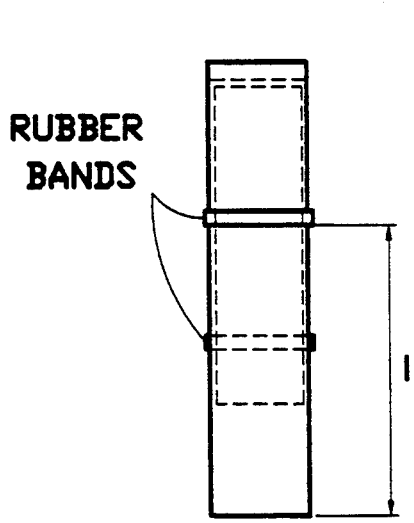
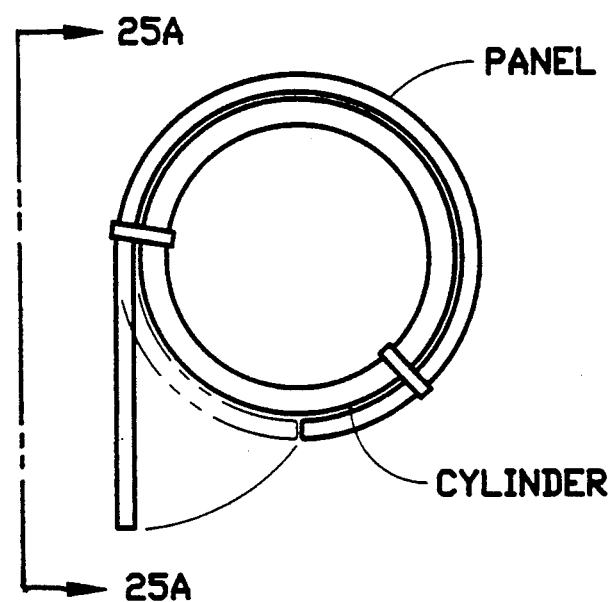
FIG. 25C
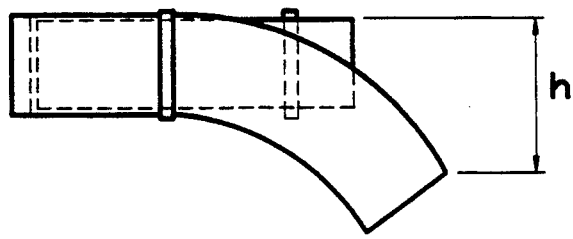

FABRIC AREA
ALUMINUM TRIANGLES
ON REVERSE SIDE

FABRIC AREA
ALUMINUM TRIANGLES
ON REVERSE SIDE

Effect of Plate Geometry on Flexibility of Hinged Assemblies

FLEXIBLE COMPOSITES HAVING FLEXING RIGID PANELS AND ARTICLES FABRICATED FROM SAME

This application is a continuation of U.S. application Ser. No. 705,679 filed May 24, 1991 now abandoned.

BACKGROUND OF THE INVENTION

1. Field of the Invention

This invention relates to flexible composites and to articles fabricated therefrom. A more preferred aspect of this invention relates to flexible composites and articles having improved penetration resistance.

2. Prior Art

Since the beginning of recorded history, a combination of rigid plates or panels affixed to a flexible backing, usually fabric or leather, has been used extensively as body armor in diverse areas of the world. (Charles Ffoulkes, *Armour and Weapons* Oxford at the Clarendar Press, 1909; H. Russell Ribinson, *Armour*, London: Hebert Jenkins, 1967; A. M. Snodgrass, *Arms and Armour of the Greeks,* Cornell University Press, Ithaca, New York, 1967; Vesey Norman, *Arms and Armor.* G. P. Putnam's Sons, New York and Claude Blair, *European Armour,* The McMillan Company, New York, 1959. During the 14th century a cloth or leather garment lined with metal plates, known as a coat of plates, was the most widely used type of body defence. It appears that the plates were rectangular in shape and their arrangement prevented draping of the armor or flexing on the bias. Almost certainly, this armor limited the mobility of the wearer. A development from the coat of plates was the brigandine which remained in general use until the 17th century. In the 15th century and later the brigandine consisted of a coat of plates made of small lames which could work over each other, thus producing a flexible protection. A variant of the brigandine, the jack, (15th century) consisted of many small plates of iron or horn secured between layers of canvass by a trellis-work of stitches. A variant of the jack was the "pennyplate coat" and was constructed from small overlapping iron discs with each disc riveted to a canvas backing. (See Claude Blair, European Armour, The MacMillan Company, New York 1959).

Roy C. Laible, *Ballistic Materials and Penetration Mechanics,* Elsevier Scientific Publishing Co. Amsterdam Oxford-New York, 1980 describes an infantry vest utilizing 149 titanium plates attached to four layers of nylon ballistic fabric backing. The plates overlapped and incorporated three slits to allow them to slide, thus providing flexibility. The plates were rectangular or square in shape and appear to be curved in plane.

U.S. Pat. No. 4,559,251 describes bullet-proof assemblies, utilizing hinged plates but such assemblies utilize relatively large roughly rectangular shaped panels. Such an approach is unlikely to lead to flexibility required for an infantry vest. U.S. Pat. No. 4,559,251 describes a material for protective clothing based on an assembly of hexagonal rigid plates. Although such a construction is an improvement over a single rigid panel it appears that the structure will have inherent limitations in flexibility, contrary to claims in the patent, which would limit its usefulness as infantry body armor.

U.S. Pat. No. 4,483,020 describes a ballistic vest which incorporates essentially square plates which interlock when flexed inward. It is claimed that such an arrangement reduces blunt trauma. A similar vest is disclosed in U.S. Pat. No. 4,660,223 which incorporates multiple titanium panels with each titanium panel bonded to aramid fabric. The panels are arranged in overlapping and abutting relationship but not connected to each other except by overlying and underlying felted material. In this disclosure all panels appear to be based on square or rectangular considerations.

A design for body armor has been disclosed in U.S. Pat. No. 4,535,478 in which modular panels have been incorporated into a carrier garment. No unusual geometric consideration were disclosed.

Multiple plate body armor has been disclosed in U.S. Pat. No. 4,680,812 which allows flexibility but protects the body from hyper-extension, thus protecting against spinal injury.

Flexible body armor has been disclosed U.S. Pat. No. 3,894,472 which has a central support sheet with the plates arranged in a checkerboard pattern. The pattern of the plates on one face are the reverse of the pattern on the opposite face. This approach claims complete coverage by rigid plates, coupled with appropriate flexibility.

An infantry body armor system has been disclosed in U.S. Pat. No. 3,557,384 which provides protection against both fragments and small arms fire. This system describes the use of a single plate on the front of the torso and a single plate on the back of the torso to provide protection against small arms fire and illustrates that relatively large plates may be utilized on a limited and specific portions of the torso.

A complex body armor system has been disclosed in U.S. Pat. No. 3,577,836 which incorporates multiple Telflon discs which are circular when viewed from the front but are elliptical in cross-section. It is claimed that the low coefficient of friction facilitates the deflection of projectiles and the elliptical cross-section minimizes the number of projectiles which can impact normal to the disc surface.

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

U.S. Pat. Nos. 4,623,574 and 4,748,064 disclose a simple composite structure comprising high strength fibers embedded in an elastomeric matrix. The simple composite structure exhibits outstanding ballistic protection as compared to simple composites utilizing rigid matrices, the results of which are disclosed in the patents. Particularly effective are simple composites employing ultra-high molecular weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elastomeric matrix material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 4,650,710 discloses a flexible article of manufacture comprising a plurality of first flexible layers arranged in a first portion of the article, each of said first layers consisting essentially of fibers having a tensile modulus of at least about 300 g/denier and a tenacity of at least about 15 g/denier and a plurality of a second flexible layers arranged in a second portion of said article, each of said second flexible layers comprising fibers, the resistance to displacement of fibers in each of said second flexible layers being greater than the resistance to displacement in each of said first flexible layers.

Other ballistic resistant articles are described in U.S Pat. Nos. 4,916,000; 4,403,012, 4,457,985; 4,737,401; 4,543,286; 4,563,392 and 4,501,856.

SUMMARY OF THE INVENTION

The present invention relates to flexible composites and to flexible articles of manufacture fabricated totally or partially therefrom. More particularly this invention provides a flexible composite comprising at least one flexible substrate having a plurality of planar bodies affixed to all or a portion of a major surface of said substrate layer, said bodies having one or more flexible seams which allow one or more portions of said bodies to flex along said seam.

Another aspect of this invention is an article of manufacture fabricated totally or in part from the composite of this invention.

Several advantages flow from this invention. For example, the composite of this invention provides a high degree of flexibility in a composite having rigid portions. In those embodiments of the invention where the planar bodies are made of a penetration resistant material and the composite is intended to provide penetration resistance, a high degree of coverage is provided. Moreover, the composite and articles exhibit relatively improved penetration resistance as compared to fibrous composites of the same areal density without unduly affecting the flexibility of the composite or article adversely. Moreover, the composite and article of this invention suffer minimal loss in puncture resistance when wet as compared to conventional puncture resistant composites and articles. Through use of this invention, relatively higher denier yarn can be employed in the manufacture of the composites and articles of this invention without unduly affecting the penetration resistance of the composite or article.

Flexible article and articles of this invention can incorporate rigid plates designed for specific protection. Composites, metal ceramics and the like can be utilized as such plates.

BRIEF DESCRIPTION OF THE DRAWINGS

The invention will be more fully understood and further advantages will become apparent when reference is made to the following detailed description of the invention and the accompanying drawings in which:

FIG. 24 is a depiction of Drape Test 1 for the evaluation of the flexibility of a composite of this invention.

FIG. 25 is a depiction of Drape Test 2 for the evaluation of the flexibility of a composite of this invention.

DETAILED DESCRIPTION OF THE PREFERRED EMBODIMENTS OF THE INVENTION

Figure 1:
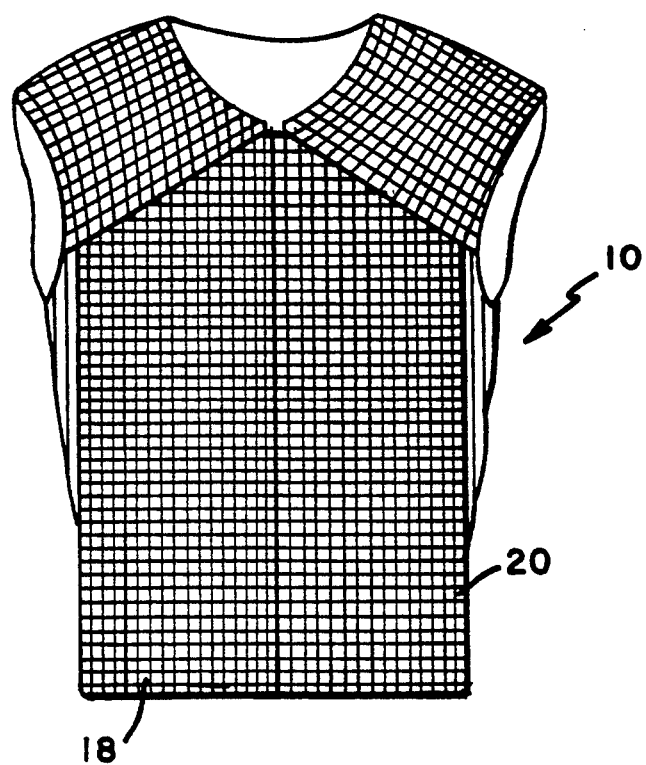
FIG. 1 is a front perspective view of a preferred embodiment of the article of this invention.

The preferred invention will be better understood by those of skill in the art by reference to the above figures. The preferred embodiments of this invention illustrated in the figures are not intended to be exhaustive or to limit the invention to the precise form disclosed. It is chosen to describe or to best explain the principles of the invention and its application and practical use to thereby enable others skilled in the art to best utilize the invention.

In its broadest aspects, the invention is directed to a multilayered article of manufacture comprising at least one flexible substrate having a plurality of metal bodies affixed to a surface thereof.

In general, the flexibility of the composite, of the present invention can be demonstrated by Drape Test 1. In this test, a 30 cm square sample of the composite is clamped horizontally along one side edge with an overhang of 20 cm as shown in FIG. 24, and the amount of drape of the composite (the amount of drape being measured by the distance between the level of the clamped side edge and the opposite edge) is measured. Composite panels were laid onto a flat surface with a portion of the panel overhanging a straight edge as shown in FIG. 24 (sideview(A). The initial test is carried out with panel sides parallel to the edge and designated 0 degrees. The ratio of drop of the unsupported side, h, to the distance of overhang, l, is taken as a measure of the flexibility. The composite panel is rotated through various angles, and the flexibility measured in a similar manner. (The relationship of panel orientation to angle designation is shown in FIG. 24 top view (B)). For flexible composites of this invention, the amount of drape is ordinarily at least about 8 cm, preferably at least about 10 cm, more preferably at least about 13 cm and most preferably at least about 17 cm.

In the preferred embodiments of the invention, the flexibility of the composite is determined by Drape Test 2. In this test, composite panels were draped around a cylinder (outer diameter(OD)=4 inches (10.2 cm) and affixed with rubber bands as shown in FIG. 25 (side view and end view). The ratio of the drop to the overhang was taken as a measure of flexibility. (See FIG. 25.) This test was used to supplement Drape Test 1 because it was noted that flexibility after flexing in one plane varied markedly with different panels.

In the more preferred embodiments of the invention, the flexibility of the composite is determined by Drape Test 3. In this drape test, the flexibility of the composite is judged in three different directions by determining if the composite can be wrapped around a cylinder having an outside diameter of 3 inches (7.6 cm). The zero degree direction was designated for the cylinder length parallel to the panel side length. Other directions were designated by the amount of rotation from this configuration.

In the preferred embodiments of the invention, the composite exhibits penetration resistance when said article is impacted by a threat without adversely affecting the flexibility of the composite to an undue extent. As used herein, the "penetration resistance" of the composite is the resistance to penetration by a designated threat, as for example, a bullet, an ice pick, a knife or the like. The penetration resistance can be expressed as the ratio of peak force (F) for designated threat (projectile, velocity, and other threat parameters known to those of skill in the art to affect peak force) divided by the areal density (ADT) of the target. As used herein, the "peak force", is the maximum force exerted by a threat to penetrate a designated target using a model 1331 high speed Instron Tester having an impact velocity of about 12 ft/sec (3.66 m/sec) and where the target strike face area has a diameter of 3 in.(7.6 cm); and as used herein, the "areal density" or "ADT" is the ratio of total target weight to the area of the target strike face.

Figure 2:
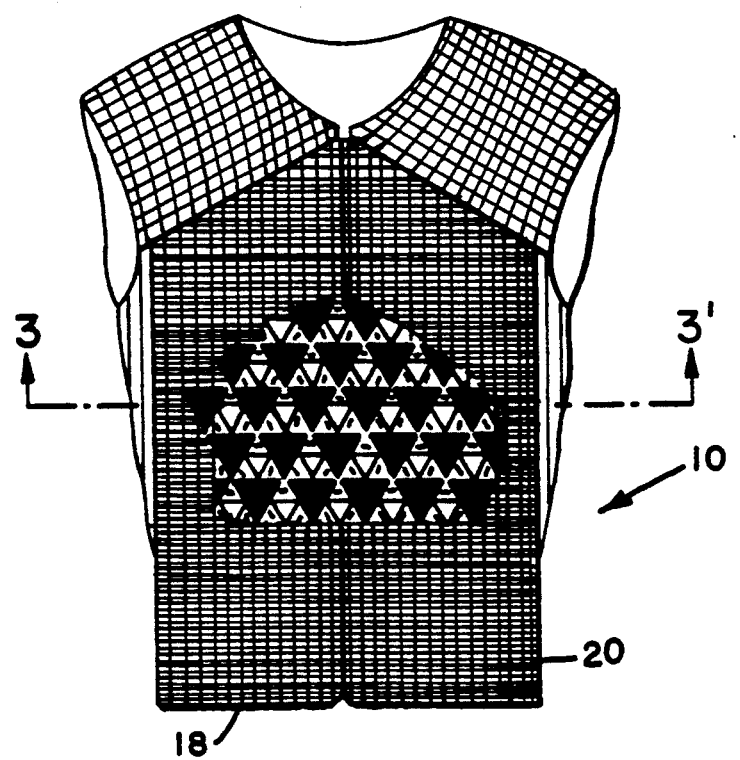
FIG. 2 is a front perspective view of the embodiment of FIG. 1 having certain selected components cut away for purpose of illustration.
Figure 3:
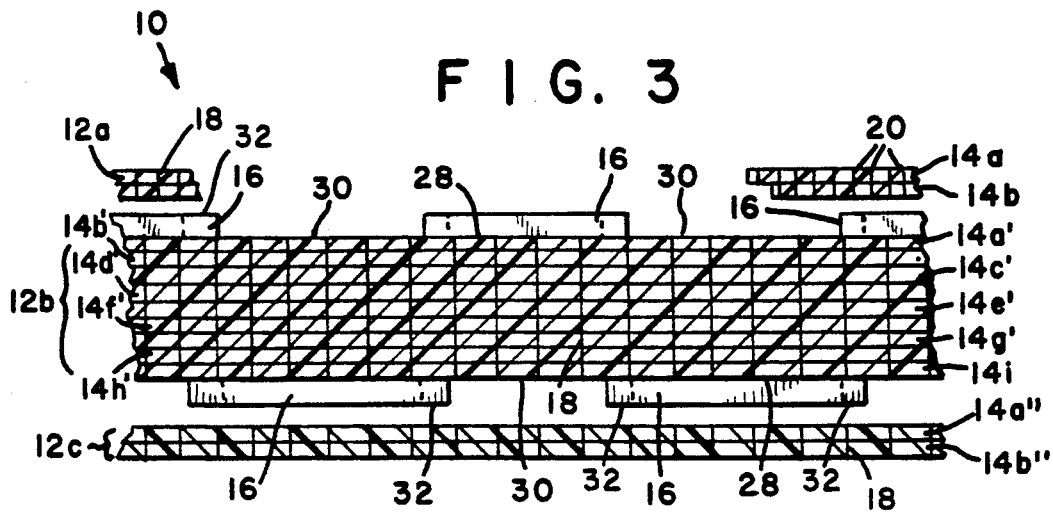
FIG. 3 is an enlarged fragmentary sectional view of the body armor of this invention of FIG. 3 taken on line 3—3' which includes a plurality of rigid ballistic resistant elements on outer surfaces of a plurality of fibrous layers.

Referring to FIGS. 1, 2 and 3, the numeral 10 indicates a ballistic resistant article 10, which in the preferred embodiments of the invention is ballistic resistant body armor. As depicted in FIG. 3, article 10 is comprised of one or more composite layers 12. At least one layer 12 comprises one or more substrate layers 14. As depicted in FIG. 3, article 10 is comprised of three layers 12a to 12c. Layers 12a include two layers 14a and 14b, layer 12b includes nine layers 14a' and 14i' and layer 12c includes two layers 14a" and 14b". However, the number of layers 12 and substrate layers 14 included in article 10 may vary widely, provided that at least two layers are present. In general, the number of layers in any embodiment will vary depending on the degree of penetration resistance and flexibility desired. The number of layers 12 and substrate layers 14 is preferably from 2 to about 70, more preferably from about 5 to about 60 and most preferably from about 20 to about 50.

As shown in FIGS. 1, 2, 3 and 4 layer 12 is formed of one or more substrate layers 14 secured together by horizontal securing means 18 and vertical securing means 20. In the illustrative embodiments of the invention depicted in the figures securing means is stitching; however, any conventional securing means may be used including but not limited to bolts, rivets, adhesive, staples, stitches, and the like. While in the embodiment of the figures all substrate layers 14 forming a fibrous layers 12 are secured together, it is contemplated that the number of layers 14 secured together may be as few as two, or any number of layers 14 in article 10 in any combination. In the preferred embodiments of the invention where the number of layers 14 is more than about 20, all the layers are not secured together. In these embodiments, from about 2 to about 20 layers, preferably from 2 to about 12 layers, more preferably from about 2 to about 10 layers and most preferably from about 2 to about 8 are secured together forming a plurality of packets (not depicted). These packets forming various fibrous layers 12 may in turn be secured together by a conventional securing means as described above.

In the preferred embodiments of the invention depicted in FIGS. 1 and 2, stitches 18 and 20 are utilized to secure substrate layers 12. The type of stitching employed may vary widely. Stitching and sewing methods such as lock stitching, chain stitching, zig-zag stitching and the like are illustrative of the type of stitching for use in this invention. An important feature of this invention is the tensile properties of the fiber used in stitching means 14 and 16. It has been found that a relatively high modulus (equal to or greater than about 200 grams/denier) and a relatively high tenacity (equal to or greater than about 5 grams/denier) fiber is essential for the beneficial effects of the invention. All tensile properties are evaluated by pulling a 10 in (25.4 cm) fiber length clamped in barrel clamps at a rate of 10 in/min (25.4 cm/min) on an Instron Tensile Tester. In the preferred embodiments of the invention, the tensile modulus is from about 400 to about 3000 grams/denier and the tenacity is from about 20 to about 50 grams/denier, more preferably the tensile modulus is from about 1000 to about 3000 grams/denier and the tenacity is from about 25 to about 50 grams/denier and most preferably the tensile modulus is from about 1500 to about 3000 grams/denier and the tenacity is from about 30 to about 50 grams/denier.

Useful threads and fibers may vary widely and will be described in more detail herein below in the discussion of fiber for use in the fabrication of fibrous layers 12. However, the thread or fiber used in stitching means 18 and 20 is preferably an aramid fiber or thread (as for example Kevlar 29, 49, 129 and 149 aramid fibers), an extended chain polyethylene thread or fiber (as for example Spectra 900 and Spectra 1000 polyethylene fibers) or a mixture thereof.

The areal density of substrate layer(s) 14 may vary widely, and will depend on a number of factors known to those of skill in the art as for example the diameter of the threat, and the like. For ballistic body armor applications, the areal density is preferably equal to or less than about 12 kg/m². In the more preferred embodiments of the invention, the areal density is equal to or less than about 7 kg/m², and in the most preferred embodiments of the invention, the areal density is equal to or less than about 6.5 kg/m².

Substrate layer 14 may vary widely, the only requirement is that it be flexible as defined above. For example, substrate layer 14 may be a flexible polymer or elastomeric film formed from a thermoplastic or elastomeric resin. Such thermoplastic and elastomeric resins for use in the practice of this invention may vary widely. Illustrative of useful thermoplastic resins are polylactones such as poly(pivalolactone), poly(e-caprolactone) and the like; polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylisopropylidiene diisocyanate, 3,3'-dimethyl-4,4'-diphenyl diisocyanate, 3,3'-dimethyl-4,4'-dephenylmethane diisocyanate, 3,3'-dimethyoxy-4,4'-biphenyl diisocyanate, dianisidine diisocyanate, tolidine diisocyanate, hexamethylene diisocyanate, 4,4'-diisocyananodiphenylemthane and the like and linear long-chain diols such as poly(tetramethylene adipate), poly(ethylene adipate), poly(1,4-butylene adipate), poly(ethylene adipate), polyether diols and the like; polycarbonates such as poly[1,1-ether bis(4-phenyl carbonate], poly[1,1-ether bis(4-phenyl) carbonate], poly[diphenylmethane bis-(4-phenyl) carbonate], poly[1,1-cyclohexane bis-(4-phenyl) carbonate], poly[1,1-cyclohexane bis(4-phenyl carbonate] and the like; poly sulfones; polyether ether ketones; polymides such as poly(4-amino butyric acid), poly(hexamethylene adipamide), poly(6-aminohexanoic aicd), poly(m-xylylene adipamide), poly(p-xylylene sebacamide), poly 2,2,2-trimethyl hexamethylene terephthalamide), poly(metaphenyleneisophthalamide) (Nomex ®), poly(p-phenylene terephthalamide) (Kevlar ®), and the like; polyesters such as poly(ethylene azelate), poly(ethylene-1,5-naphthalate), poly(ethylene oxybenzoate) (A-Tell), poly(ethylene oxybienzoate) (A-Tell), poly(parahydroxy benzoate) (Ekonol), poly(1,4-cyclohexylidene dimethylene terephthalate) (Kodel)(as), poly(1,4-cyclohexylidene dimethylene terephthalate) (Kodel)(trans), polyethylene terephthalate terephthalate and the like; poly(arylene oxides) such as poly(2,6-diphenyl-1,4-phenylene oxide), poly(2,6-diphenyl-1,4-phenylene oxide) and the like; poly(arylene sulfides) such as poly(phenylene sulfide) and the like; polyetherimides; thermoplastic elastomers such as polyurethane elastomers, fluoroelastomers, butadiene/acrylonitrule elastomers, block copolymers, made up of segments of glassy or crystalline blocks such as polystyrene, poly(vinyltoluene), poly(t-butyl styrene), polyester and the like and the elastomeric blocks such as polybutadiene, polyisoprene, ethylene/propylene copolymers, ethylene/butylene copolymers, polyether ester and the like as for example the copolymers in polystyrene/polybutadiene/polystrene block copolymer manufactured by Shell Chemical Company under the trade name of Kraton ®; vinyl polymer and their copolymers such as polyvinyl acetate, polyvinyl alcohol, polyvinyl chloride, polyvinyl butyral, polyvinylidene chloride, ethylene/vinyl acetate copolymers, and the like; polyacrylics, polyacrylate and their copolymers such as polyethyl acrylate, poly(n-butyl acrylate), polymethyl methacrylate, polyethyl methacrylate, poly(n-butyl methacrylate), polyacrylamide, polyacrylonitrile, poly acrylic acid, ethylene/acrylic acid copolymers, methyl methacrylate/styrene copolymers, ethylene/ethyl acrylate copolymers, methacrylated butadiene/styrene copolymers and the like; polyolefins such as low density polyethylene, polyolefins such as low density polyethylene, polypropylene, chlorinated low density polyethlene, poly(4-methyl-1-pentene) and the like; ionomers; and polyepichlorohydrins; polycarbonates and the like.

Substrate layer 14 may also comprise a network of fibers either alone or dispersed in a matrix. For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip, and the like having regular or irregular cross sections. The term fibers includes a plurality of any one or combination of the above.

The cross-section of fibers for use in this invention may vary widely. Useful fibers may have a circular cross-section, oblong cross-section or irregular or regular multi-lobal cross-section having one or more regular or irregular lobes projecting from the linear or longitudinal axis of the fibers. In the particularly preferred embodiments of the invention, the fibers are of substantially circular or oblong cross-section and in the most preferred embodiments are of circular or substantially circular cross-section.

Layer 14 may be formed from fibers alone, or from fibers coated with a suitable polymer, as for example, a polyolefin, polyamide, polyester, polydiene such as a polybutadiene, urethanes, diene/olefin copolymers, poly(styrene/butadiene/styrene) block copolymers, and a wide variety of elastomers. Substrate layer 14 may also comprise a network of fibers dispersed in a polymeric matrix as for example a matrix of one or more of the above referenced polymers to form a flexible composite as described in more detail in U.S. Pat. Nos.4,623,574; 4,748,064; 4,916,000; 4,403,012; 4,457,985; 4,650,710; 4,681,792; 4,737,401; 4,543,286; 4,563,392; and 4,501,856. Regardless of the construction, substrate layer 14 is such that article 10 has the required degree of flexibility.

The fibers in substrate layer 14 may be arranged in networks having various configurations. For example, a plurality of fibers can be grouped together to form twisted or untwisted yarn bundles in various alignments. The filaments or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al., *J. Macromol Sci. Chem.*, A7(1), pp. 203 et. seq. (1973) are particularly suitable.

The type of fibers used in the fabrication of substrate layer 14 may vary widely depending on the application. Useful fibers may be inorganic or organic fibers having varying elasticity, tenacity and modulus. For example, in those instances where layers 14 will not provide penetration resistance and are merely to support planar bodies 16, fibers having relatively low tenacities (ie less than about 5 grams/denier and low tensile modulus (ie less than about 25 grams/denier) may be used. On the other hand, in those applications where layers 14 will provide some penetration resistance fibers having relative high tenacity (ie greater than or equal to about 5 grams/denier) and high tensile modulus (ie greater than or equal to about 25 grams/denier.) In the preferred embodiments of the invention layers 14 will contribute to the penetration resistance. Preferred fibers for use in the practice of this invention are those having a tenacity equal to or greater than about 10 grams/denier (g/d) (as measured by an Instron Tensile Testing machine), a tensile modulus equal to or greater than about 25 g/d (as measured by an Instron Tensile Testing machine) and an energy-to-break equal to or greater than about 8 joules/gram. Particularly preferred fibers are those having a tenacity equal to or greater than about 15 g/d, a tensile modulus equal to or greater than about 150 g/d and energy-to-break equal to or greater than about 30 joules/grams. Amongst these particularly preferred embodiments, most preferred are those embodiments in which the tenacity of the fibers is equal to or greater than about 20 g/d, the tensile modulus is equal to or greater than about 1000 g/d, and the energy-to-break is equal to or greater than about 35 joules/gram. In the practice of this invention, filaments of choice have a tenacity equal to or greater than about 30 g/d, the tensile modulus is equal to or greater than about 1300 g/d and the energy-to-break is equal to or greater than about 40 joules/gram.

The denier of the fiber may vary widely. In general, fiber denier is equal to or less than about 4000. In the preferred embodiments of the invention, fiber denier is from about 10 to about 4000, the more preferred embodiments of the invention fiber denier is from about 10 to about 1000 and in the most preferred embodiments of the invention, fiber denier is from about 10 to about 400. Useful inorganic fibers include S-glass fibers, E-glass fibers, carbon fibers, boron fibers, alumina fibers, zirconia-silica fibers, alumina-silica fibers and the like.

Illustrative of useful organic fibers are those composed of polyesters, polyolefins, polyetheramides, fluoropolymers, polyethers, celluloses, phenolics, polyesteramides, polyurethanes, epoxies, aminoplastics, polysulfones, polyetherketones, polyetheretherketones, polyesterimides, polyphenylene sulfides, polyether acryl ketones, poly(amideimides), and polyimides. Illustrative of other useful organic filaments are those composed of aramids (aromatic polyamides), such as poly(m-xylylene adipamide), poly(p-xylylene sebacamide), poly 2,2,2-trimethylhexamethylene terephthalamide), poly (piperazine sebacamide), poly (metaphenylene isophthalamide) and poly (p-phenylene terephthalamide); aliphatic and cycloaliphatic polyamides, such as the copolyamide of 30% hexamethylene diammonium isophthalate and 70% hexamethylene diammonium adipate, the copolyamide of up to 30% bis-(-amidocyclohexyl)methylene, terephthalic acid and caprolactam, polyhexamethylene adipamide (nylon 66), poly(-butyrolactam) (nylon 4), poly (9-aminoonanoic acid) (nylon 9), poly(enantholactam) (nylon 7), poly(capryllactam) (nylon 8), polycaprolactam (nylon 6), poly (p-phenylene terephthalamide), polyhexamethylene sebacamide (nylon 6,10), polyaminoundecanamide (nylon 11), polydodeconolactam (nylon 12), polyhexamethylene isophthalamide, polyhexamethylene terephthalamide, polycaproamide, poly(nonamethylene azelamide) (nylon 9,9), poly(decamethylene azelamide) (nylon 10,9), poly(decamethylene sebacamide) (nylon 10,10), poly[bis-(4-aminocyclothexyl) methane 1,10decanedicarboxamide] (Qiana) (trans), or combination thereof; and aliphatic, cycloaliphatic and aromatic polyesters such as poly(1,4-cyclohexlidene dimethyl eneterephathalate) cis and trans, poly(ethylene-1,5-naphthalate), poly(ethylene-2,6-naphthalate), poly(1,4-cyclohexane dimethylene terephthalate) (trans), poly(-decamethylene terephthalate), poly(ethylene terephthalate), poly(ethylene isophthalate), poly(ethylene oxybenozoate), poly(para-hydroxy benzoate), poly(-dimethylpropiolactone), poly(decamethylene adipate), poly(ethylene succinate), poly(ethylene azelate), poly(-decamethylene sebacate), poly(-dimethyl-propiolactone), and the like. Also illustrative of useful organic fibers are those of liquid crystalline polymers such as lyotropic liquid crystalline polymers which include polypeptides such as poly-$\alpha$-benzyl L-glutamate and the like; aromatic polyamides such as poly(1,4-benzamide), poly(chloro-1,4-phenylene terephthalamide), poly(1,4-phenylene fumaramide), poly(chloro-1,4-phenylene fumaramide), poly(4,4'-benzanilide trans, trans-muconamide), poly(1,4-phenylene mesaconamide), poly(1,4-phenylene) (trans-1,4-cyclohexylene amide), poly(-chloro-1,4-phenylene) (trans-1,4-cyclohexylene amide), poly(1,4-phenylene 1,4-dimethyl-trans-1,4-cyclohexylene amide), poly(1,4-phenylene 2,5-pyridine amide), poly(chloro-1,4-phenylene 2,5-pyridine amide), poly(3,3'-dimethyl-4,4'-biphenylene 2,5-pyridine amide), poly(1,4-phenylene 4,4'-stilbene amide), poly(chloro-1,4-phenylene 4,4'-stilbene amide), poly(1,4-phenylene 4,4'-azobenzene amide), poly(4,4'-azobenzene 4,4'-azobenzene amide), poly(1,4-phenylene 4,4'-azoxybenzene amide), poly(4,4'-azobenzene 4,4'-azoxybenzene amide), poly(1,4-cyclohexylene 4,4'-azobenzene amide), poly(4,4'-azobenzene terephthal amide), poly(3,8-phenanthridinone terephthal amide), poly(4,4'-biphenylene terephthal amide), poly(4,4'-biphenylene 4,4'-bibenzo amide), poly(1,4-phenylene 4,4'-bibenzo amide), poly(1,4-phenylene 4,4'-terephenylene amide), poly(1,4-phenylene 2,6-naphthal amide), poly(1,5-naphthylene terephthal amide), poly(3,3'-dimethyl-4,4-biphenylene terephthal amide), poly(3,3'-dimethoxy-4,4'-biphenylene terephthal amide), poly(3,3'-dimethoxy-4,4-biphenylene 4,4'-bibenzo amide) and the like; polyoxamides such as those derived from 2,2-dimethyl-4,4'diamino biphenyl and chloro-1,4-phenylene diamine; polyhydrazides such as poly chloroterephthalic hydrazide, 2,5-pyridine dicarboxylic acid hydrazide) poly(terephthalic hydrazide), poly(terephthalicchloroterephthalic hydrazide) and the like; poly(amide-hydrazides) such as poly(terephthaloyl 1,4 amino-benzhydrazide) and those prepared from 4-amino-benzhydrazide, oxalic dihydrazide, terephthalic dihydrazide and para-aromatic diacid chlorides; polyesters such as those of the compositions include poly(oxy-trans-1,4-cyclohexyleneoxycarbonyl-trans-1,4-cyclohexylenecarb onyl-$\beta$-oxy-1,4-phenyleneoxyterephthaloyl) and poly(oxy-cis-1,4-cyclohexyleneoxycarbonyl-trans-1,4-cy clohexylenecarbonyl-$\beta$-oxy-1,4-phenyleneoxyterephthal oyl) in methylene chloride-o-cresol poly[(oxy-trans-1,4-cyclohexyleneoxycarbonyl-trans-1,4 -cyclohexylenecarbonyl-b-oxy-(2-methyl-1,4-phenylene) oxy-terephthaloyl)] in 1,1,2,2-tetrachloro-ethane-o-chlorophenol-phenol (60:25:15 vol/vol/vol), poly[oxy-trans-1,4-cyclohexyleneoxycarbonyl-trans-1,4-cyclohexylenecarbonyl-b-oxy(2-methyl-1,3-phenylene)oxy -terephthaloyl] in o-chlorophenol and the like; polyazomethines such as those prepared from 4,4'-diaminobenzanilide and terephthaldehyde, methyl-1,4-phenylenediamine and terephthalaldelyde and the like; polyisocyanides such as poly(-phenyl ethyl isocyanide), poly(n-octyl isocyanide) and the like; polyisocyanates such as poly(n-alkyl isocyanates) as for example poly(n-butyl isocyanate), poly(n-hexyl isocyanate) and the like; lyotropic crystalline polymers with heterocylic units such as poly(1,4-phenylene-2,6-benzobisthiazole)(PBT), poly(1,4- phenylene -2,6-benzobisoxazole) (PBO), poly(1,4-phenylene-1,3,4-oxadiazole), poly(1,4-phenylene-2,6-benzobisimidazole), poly[2,5(6)-benzimidazole] (AB-PBI), poly[2,6-(1,4-phneylene)-4-phenylquinoline], poly[1,1'-(4,4'-biphenylene)-6,6'-bis(4-phenylquinolin e)] and the like; polyorganophosphazines such as polyphosphazine, polybisphenoxyphosphazine, poly[bis(2,2,2-trifluoroethyelene) phosphazine] and the like; metal polymers such as those derived by condensation of trans-bis(tri-n-butylphosphine) platinum dichloride with a bisacetylene or trans-bis(tri-n-butylphosphine)bis(1,4-butadienyl)platinum and similar combinations in the presence of cuprous iodine and an amide; cellulose and cellulose derivatives such as esters of cellulose as for example triacetate cellulose, acetate cellulose, acetate-butyrate cellulose, nitrate cellulose, and sulfate cellulose, ethers of cellulose as for example, ethyl ether cellulose, hydroxymethyl ether cellulose, hydroxypropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxypropyl ether cellulose, and urethane cellulose as for example phenyl urethane cellulose; thermotropic liquid crystalline polymers such as celluloses and their derivatives as for example hydroxypropyl cellulose, ethyl cellulose propionoxypropyl cellulose, thermotropic liquid crystalline polymers such as celluloses and their derivatives as for example hydroxypropyl cellulose, ethyl cellulose propionoxypropyl cellulose; thermotropic copolyesters as for example copolymers of 6-hydroxy-2- naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydroxy-2-naphthoic acid, p-hydroxy benzoic acid, hydroquinone and terephthalic acid, copolymers of 2,6-naphthalene dicarboxylic acid, terephthalic acid, isophthalic acid and hydroquinone, copolymers of 2,6-naphthalene dicarboxylic acid and terephthalic acid, copolymers of p-hydroxybenzoic acid, terephthalic acid and 4,4'-dihydoxydiphenyl, copolymers of p-hydroxybenzoic acid, terephthalic acid, isophthalic acid and 4,4'-dihydroxydiphenyl, p-hydroxybenzoic acid, isophthalic acid, hydroquinone and 4,4'-dihydroxybenzophenone, copolymers of phenylterephthalic acid and hydroquinone, copolymers of chlorohydroquinone, terephthalic acid and p-acetoxy cinnamic acid, copolymers of chlorohydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl)hydroquinone, terephthalic acid and hydroquinone, and copolymers of poly(ethylene terephthalate) and p-hydroxybenzoic acid; and thermotropic polyamides and thermotropic copoly(amide-esters).

Also illustrative of useful organic filaments for use in the fabrication of substrate layer 14 are those composed of extended chain polymers formed by polymerization of $\alpha$, $\beta$-unsaturated monomers of the formula:

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of $\alpha$, $\beta$-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(1-pentene), poly(4-methoxystrene), poly(5-methyl-1-hexene), poly(4-methylpentene), poly (1-butene), polyvinyl chloride, polybutylene, polyacrylonitrile, poly(methyl pentene-1), poly(vinyl alcohol), poly(vinyl-acetate), poly(vinyl butyral), poly(vinyl chloride), poly(vinylidene chloride), vinyl chloride-vinyl acetate chloride copolymer, poly(vinylidene fluoride), poly(methyl acrylate), poly(methyl methacrylate), poly(methacrylonitrile), poly(acrylamide), poly(vinyl fluoride), poly(vinyl formal), poly(3-methyl-1-butene), poly(1-pentene), poly(4-methyl-1-butene), poly(1-pentene), poly(4-methyl-1-pentene, poly(1-hexane), poly(5-methyl-1-hexene), poly(vinyl-cyclopentane), poly(vinylcyclothexane), poly(a-vinyl-naphthalene), poly(vinyl methyl ether), poly(vinyl-ethylether), poly(vinyl propylether), poly(vinyl carbazole), poly(vinyl pyrolidone), poly(2-chlorostyrene), poly(4-chlorostyrene), poly(vinyl formate), poly(vinyl butyl ether), poly(vinyl octyl ether), poly(vinyl methyl ketone), poly(methyl-isopropenyl ketone), poly(4-phenylstyrene) and the like.

In the most preferred embodiments of the invention, article 10 includes a fibrous substrate layer 14, which may include high molecular weight polyethylene fibers, high molecular weight polypropylene fibers, nylon fibers (such as nylon, nylon 66, etc), polyester fibers such as poly(ethylene terephthalate) fibers, aramid fibers, high molecular weight polyvinyl alcohol fibers, high molecular weight polyacrylonitrile fibers or mixtures thereof. U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of molecular weight of at least 150,000, preferably at least one million and more preferably between two million and five million. Such extended chain polyethylene (ECPE) fibers may be grown in solution as described in U.S. Pat. No. 4,137,394, U.S. Pat. No. 4,356,138, issued Oct. 26, 1982, or fibers spun from a solution to form a gel structure, as described in German Off. 3,004,699 and GB 2051667, and especially described in U.S. Pat. No. 4,551,296 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fibers. The tenacity of the fibers should be at least 15 grams/denier (as measured by an Instron Testing Machine), preferably at least 20 grams/denier, more preferably at least 25 grams/denier and most preferably at least 30 grams/denier. Similarly, the tensile modulus of the fibers, as measured by an Instron Tensile Testing Machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel fibers processes.

Similarly, highly oriented polypropylene fibers of molecular weight at least 200,000, preferably at least one million and more preferably at least two million may be used. Such high molecular weight polypropylene may be formed into reasonably well oriented fibers by the techniques prescribed in the various references referred to above, and especially by the technique of U.S. Pat. No. 4,551,296. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier (as measured by an Instron Tensile Testing Machine), with a preferred tenacity being at least 11 grams/denier. The tensile modulus for polypropylene is at least 160 grams/denier, preferably at least 200 grams/denier. The particularly preferred ranges for the above-described parameters can advantageously provide improved performance in the final article.

High molecular weight polyvinyl alcohol fibers having high tensile modulus are described in U.S. Pat. No. 4,440,711, which is hereby incorporated by reference to the extent it is not inconsistent herewith. In the case of polyvinyl alcohol (PV-OH), PV-OH fiber of molecular weight of at least about 200,000. Particularly useful PV-OH fiber should have a tensile modulus of at least about 300 g/d (as measured by an Instron Tensile Testing Machine), a tenacity of at least 7 g/d (preferably at least about 10 g/d, more preferably at about 14 g/d, and most preferably at least about 17 g/d), and an energy-to-break of at least about 8 joules/gram. PV-OH fibers having a weight average molecular weight of at least about 200,000, a tenacity of at least about 10 g/d, a tensile modulus of at least about 300 g/d, and an energy-to-break of about 8 joules/gram are more useful in producing a ballistic resistant article. PV-OH fiber having such properties can be produced, for example, by the process disclosed in U.S. Patent No. 4,599,267.

In the case of polyacrylonitrile (PAN), PAN fibers of molecular weight of at least about 400,000. Particularly useful PAN fibers should have a tenacity of at least about 10 g/d and an energy-to-break of at least about 8 joules/gram. PAN fibers having a molecular weight of at least about 400,000, a tenacity of at least about 15 to about 20 g/d and an energy-to-break of at least 8 joules/gram is most useful in producing ballistic resistant articles; and such fibers are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fiber will have a tenacity of at least about 20 g/d (as measured by an Instron Tensile Testing Machine), a tensile modulus of at least about 400 g/d (as measured by an instron Tensile Testing Machine) and an energy-to-break at least about 8 joules/gram, and particularly preferred aramid fiber will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenyleneterephthalamide) fibers produced commercially by Dupont Corporation under the trade name of Kevlar ® 29, 49, 129 and 149 having moderately high moduli and tenacity values are particularly useful in forming ballistic resistant composites. Also useful in the practice of this invention is poly(metaphenylene isophthalamide) fibers produced commercially by Dupont under the tradename Nomex ®.

In the case of liquid crystal copolyesters, suitable fibers are disclosed, for example, in U.S. Pat. Nos. 3,975,487; 4,118,372; and 4,161,470, hereby incorporated by reference. Tenacities of about 15 to about 30 g/d (as measured by an Instron Tensile Testing Machine) and preferably about 20 to about 25 g/d, and tensile modulus of about 500 to 1500 g/d (as measured by an Instron Tensile Testing Machine) and preferably about 1000 to about 1200 g/d are particularly desirable.

As depicted in FIGS. 5 to 23, planar bodies 16 contain one or more flexing seams 32 to allow flexing of one or more portions of planar bodies 16 about seams 32. In general, the greater the number of flexing seams 32, the greater the flexibility of article 10, and conversely, the fewer the number of flexing seams 32, the less the flexibility. Thus, the number of flexing seams 32 will be varied to provide the desired degree of flexibility to the appropriate portion of article 10. For example, for frontal portions of article 10 where relatively less flexibility is required planar bodies 16 will include fewer seams 32. On the other hand, side portions of article 10 where more flexibility is required planar bodies 16 having a relatively larger number seams 32 are employed. In the preferred embodiments of the invention, where more flexibility is required, planar bodies 16 will include two or more flexing seams 32 as described in FIGS. 9 and 11 to 23. In the more preferred embodiments of this invention where more flexibility is required planar bodies 16 will include three or more flexing seams 32 as described in FIGS. 9, 14, 15, 22 and 23. In those embodiments of the invention where planar bodies 16 include two or more seams, the seams may be parallel or at an angle with respect to each other. In the preferred embodiments, the seams are at an angle in order to allow flexing in multiple directions. Such constructions regardless of the thickness and rigidity of planar body 16 can drape around doubly curved surfaces and thus exhibit the desired flexibility. In the more preferred embodiments of the invention, the seams are at an angle of from about 30° to about 150°, preferably at an angle of from about 60° C. to about 120° C. As depicted in FIGS. 9, 12, 14, 15, 19, 20, 22 and 23 in the most preferred embodiments of the invention, the seams are such that the planar body 16 is divided into triangular shaped portions, preferably right angle triangles, equilateral triangles or a combination thereof and more preferably equilateral triangles). Seams 32 may also sub divide planar body 16 into shapes obtainable by fusion of two or more triangles at appropriate edges, such as hexagons, parallelograms, trapezoids and the like or a combination of such shapes and triangular shaped bodies, especially equilateral triangular shaped bodies see for example FIGS. 11, 12, 16, 17 and 21. Bodies 16 are preferably positioned such that at least one seam of one planar body 16 is in substantial alignment with at least one seam of an adjacent planar body 16, preferably such that the combination of planar bodies 16 provide at least one, preferably at least two and more preferably three or more seams of the same or different seam directions along which article 10 may flex.

Flexing seams 32 can be formed by any conventional means which will allow a flexing portion of planar body 16 to flex away from the plane of a non-flexing portion of body 16. For example, one method which can be employed is spirally wound metallic or polymeric thread. In these embodiments, the thread is preferably formed from an elastomeric material because while it holds the sides of the flexing and non flexing portions of planar body 16 together, it easily allows significant flexing. Although such elastomeric material may allow momentary openings between non flexing portions of planar bodies 16 and flexing portions under severe flexing, the structure should close immediately when such flexing ceases. Still other suitable hinging means include flexible tape, taping adjacent sides together; conventional hinges; rings; pins and the like. Various means used to form the flexible seams are not critical provided that they allow some degree of flexing along the seam.

Figure 22:
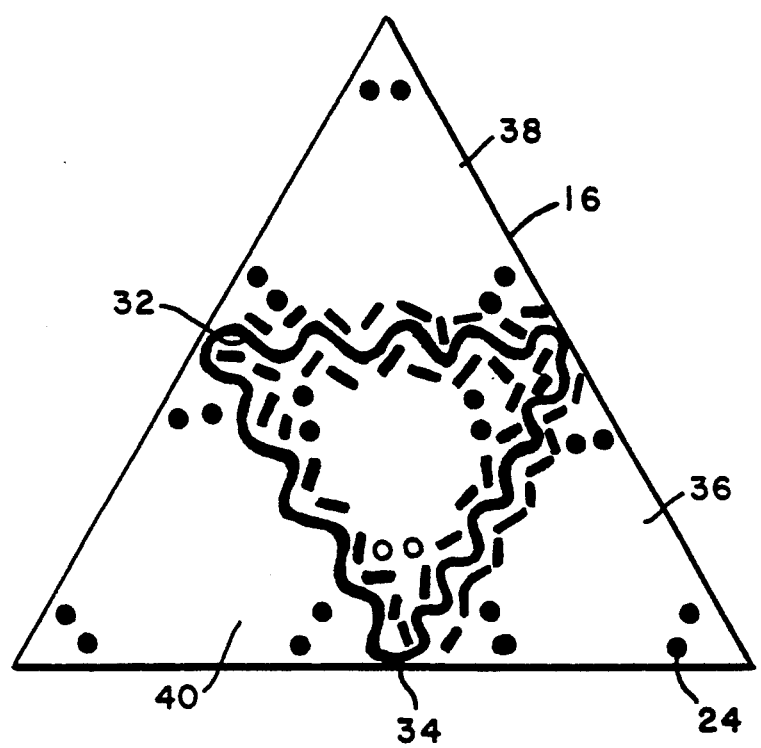
Figure 23:
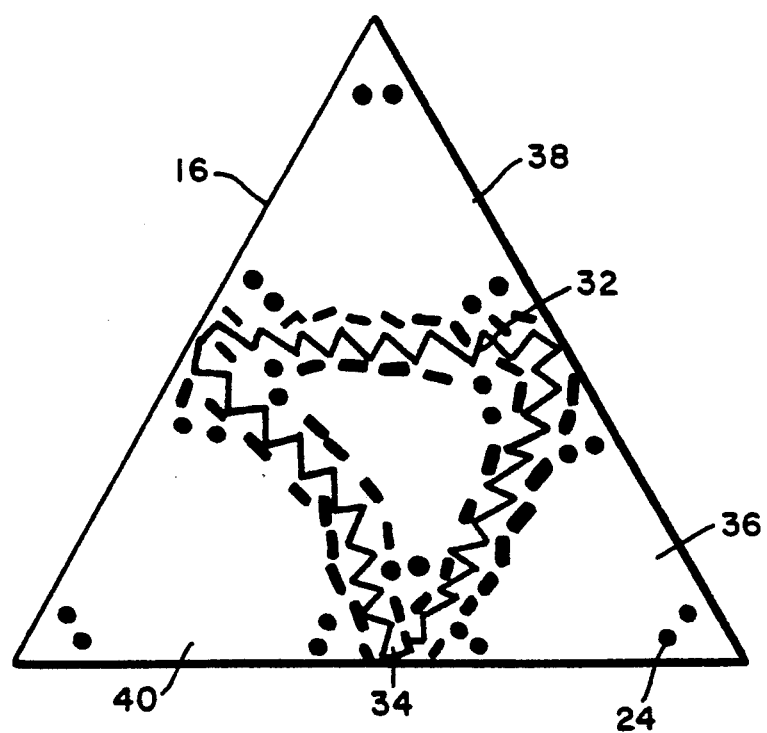

The nature of the flexing seam 32 may vary widely. As depicted in FIGS. 9 to 21, straight flexing seams 32 are employed. Straight flexing seams 32 may have perpendicular side walls or the side walls may be at an angle or bevelled or a combination. The mating sides of flexing seams 32 may be other than straight. For example, as depicted in FIG. 22 the mating surfaces may be curved or as depicted in FIG. 23, the mating surfaces may be saw toothed. In these designs, depending on the length of any straight portion of the mated sides, penetration of seams by objects such as knives and the like is more difficult.

As depicted in FIGS. 2 to 18, article 10 of this invention includes a plurality of planar bodies 16 affixed to one or more surfaces of one or more of substrate layers 14. As a ballistic missile impacts a planar body 16, the missile can be broken and/or enlarged and flattened to increase its impact area and decrease the velocity of the missile. Means for attaching planar bodies 16 to substrate layer 14 may vary widely and may include any means normally used in the art to provide this function. Illustrative of useful attaching means are adhesives such as those discussed in R. C. Liable, *Ballistic Materials and Penetration Mechanics*, Elsevier Scientific Publishing Co. (1980). Illustrative of other useful attaching means are bolts, screws, staples mechanical interlocks, stitching, or a combination of any of these conventional methods. As depicted in FIGS. 2, 5, 6 and 13 in the preferred embodiments of the invention planar bodies 16 are stitched to the surface of layer 14. Optionally, the stitching may be supplemented by and/or replaced by other types of securing means such as adhesive.

As depicted in the FIGS. 2, 5 to 23 and 27 to 29 flexing and non flexing portions of planar bodies 16 may be affixed to a surface of layer 14 by stitches 22 which extend through one or more substrate layers 14. For example, in the embodiment of FIG. 4, one portion of planar 16 may be affixed to the surface of layer 14 by stitches 22 which extend through layers 14$a'$, 14$b'$, 14$c'$, 14$d'$, 14$e'$, 14$f$, 14$g'$, 14$h'$, 14$i'$, while other portions are connected by stitches 22 which extend only through substrate layer 14$a'$, 14$b'$, and 14$c'$, or through layers 14$a'$ and 14$b$ or even through layers 14$a'$. In general, the greater the number of layers 14 through which stitches 22 extend, the less the extent to which the portion of planar body 16 affixed by such stitches can flex along a flexing seam 32; and conversely, the fewer the layers through which stitches 22 extend, the greater the extent to which the portion of planar body 16 affixed by such stitches may flex along a flexing seam 32. Thus, where greater flexibility is desired, stitches 22 extend through fewer substrate layer 14 and were less flexibility is desired, stitches 22 extend through more layers 14. For example, in the case of the preferred triangular planar bodies of FIGS. 14, 22 and 23, the central triangular portion 34 is affixed to a surface substrate layer 14 by stitches 22 (not depicted) which extend through more substrate layers than the stitches 22 which affix portions 36, 38 and 40. A result is that portions 36, 28 and 40 are able to flex more than portion 34. Similarily, in the case of the preferred embodiments of FIGS. 19, 20 and 21 in which planar body 16 are of shape which can be subdivided into triangular shaped portions such as parallogram and trapzoidal shapes, one or more portions of the body can be affixed to a surface by stitches 22 extending through a relatively large number of layers 14 and one or more portions can be affixed by stitches 22 extending through a relatively few number of layers 14. For example, in FIGS. 19, 20 and 21 portion 42 and 44 of FIG. 19, portion 50 of FIG. 20 and portion 56 of FIG. 21 can be affixed by stitches 22 extending through a larger number of layers 14 than the number of layers 14 through which stitches 22 affix portions 46 and 48 of FIG. 19, portions 52 and 54 of FIG. 20 and portions 58 and 60 of FIG. 21.

As depicted in FIG. 3, 4, 5, and 6 in cross-section, article 10 comprises three distinct layers 12$a$, 12$b$ and 12$c$, each consisting of a plurality of substrate layers 14, stitched together by horizontal stitches 18 and vertical stitches 20 (not depicted). Layer 12$a$ is the outer layer which is exposed to the environment, and layer 12$c$ is the inner layer closest to the body of the wearer. The two covering layers 12$a$ and 12$c$ sandwich a ballistic layer 12$b$, which, in the body armor of the figures comprises a plurality of stitched substrate layers 14$a'$ to 14$k'$ (FIG. 4) and 14$a'$ to 14$i'$ (FIG. 3) having a plurality of planar bodies partially covering both outer surfaces of said plurality of layers 14 forming a pattern of covered areas 28 and uncovered areas 30 on the outer surfaces. As shown in FIG. 3, the plurality of planar bodies 26 are positioned on the two surfaces such that the covered areas 28 on one surface are aligned with the uncovered areas 30 on the other surface. In the preferred embodiments of the invention depicted in FIG. 3 and 4, each planar body 16 is uniformly larger than its corresponding uncovered area 30 such that planar bodies 16 adjacent to an uncovered area 30 partially overlap with the corresponding planar body 16 (of the area 30) on the other outer surface of the plurality of layers 14 by some portion 32. The degree of overlap may vary widely, but in general is such that preferably more than about 90 area %, more preferably more than about 95 area % and most preferably more than about 99 area % of the uncovered areas 30 on an outer surface of the plurality of layers 14 are covered by its corresponding planar body 16 on the other outer surface of the plurality of layers 14.

Figure 4:
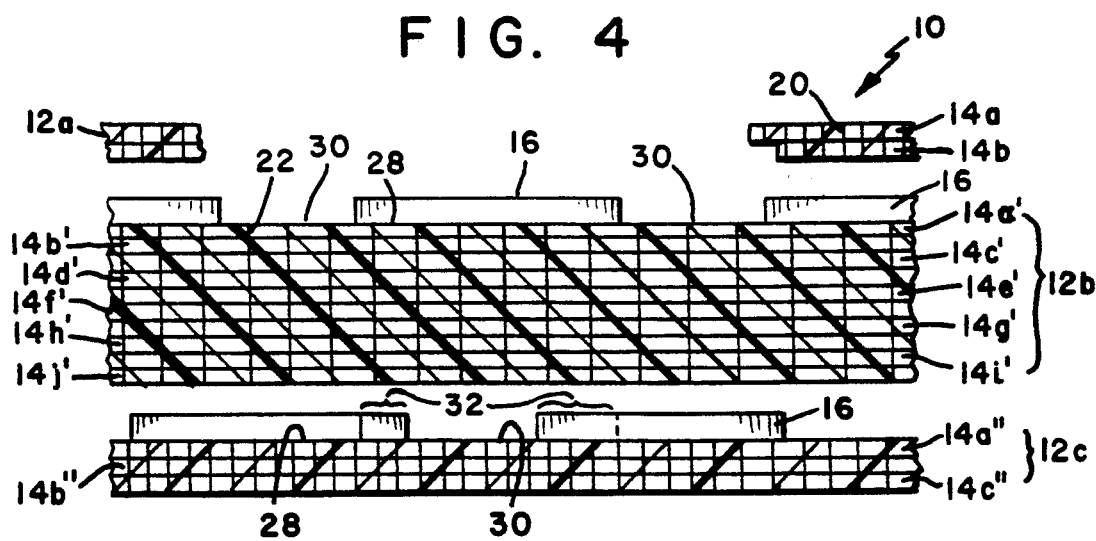
FIG. 4 is an enlarged fragmental sectional view of the body armor of this invention FIG. 2 taken on line 3—3' which includes a plurality of rigid ballistic elements on one side of two fibrous layers.

FIG. 4 depicts a variant of the embodiment of FIG. 3 which differs by placing planar bodies 16 on a surface of layer 12b and on a surface of layer 12(c). Corresponding parts are referred to by like numerals.

As shown in the Figures, the position of planar bodies 16 can vary widely but is preferably chosen such that at least one seam 32 of adjacent planar bodies 16 are in substantial alignment. This results in seams in the composite as a whole which enhances flexibility. For example, planar bodies 16 may be on an outside surface of a fibrous layer 12 or may be encapsulated inside of the plurality of fibrous layers 14 on interior surfaces. As depicted in FIGS. 3 to 18, planar bodies 16 are preferably space filling and will provide more than one, preferably two or three and more preferably three semi-continuous or continuous seams in different directions which preferably intersect at an angle with each other (preferably at an angle of from about 30° to about 150°, more preferably at an angle of from about 60° to about 120° and most preferably at an angle of about 60°) in order to allow flexing in multiple directions.

The number of planar bodies 16 may vary widely, the only requirement is that there is at least one planar body 16 bound to a surface of at least one layer 14. Planar bodies 16 can be affixed using any conventional means as for example bolts, screws, stitches, bolts and the like. In the preferred embodiments of the invention, planar bodies 16 are sewn to at least one surface of each layer 14, and the number and types of planar bodies 16 are such that article 10 has the required flexibility.

The shape of planar bodies 16 and the area percent of layer 14 covered by planar bodies 16 may vary widely. For example, planar bodies 16 may be in the form of a sheet or sheet-like (e.g. contiguous or overlapping ribbons, steps, squares and the like preferably with rounded or truncated edges to minimize damage to substrate layer 14 which form a sheet-like layer) which is bonded to or in contact with 100 percent or substantially one hundred percent of a surface of layer 14. Alternatively, planar bodies 16 may be formed from a plurality of various geometrically shaped planar bodies (e.g. ribbons, hexagons, triangles, rectangles, squares, strips) which cover less than 100% of the surface of layer 14. In the preferred embodiments of this invention, planar bodies 16 affixed to a least about 5 area percent of a major surface of substrate layer 14 based on the total area of said surface. In the more preferred embodiments of the invention, planar bodies 16 are affixed to at least about 20 area percent of a major surface of layer 14, and in the most preferred embodiments of the invention, planar bodies 16 are affixed to at least about 50 area percent of a major surface of a fibrous layer 14.

Affixation of a planar bodies 16 to a substrate layer 14 as continuous sheet may cause stiffening of the structure. Although for certain applications this may be acceptable provided that article 10 has the required degree of flexibility, for many applications where relatively high penetration resistance and flexibility are desired, such as a ballistic resistant vest, it is desirable to affix planar bodies 16 to substrate layer 14 such that the desired flexibility is obtained. As shown in the Figures, this is preferably accomplished by affixing planar bodies 16 as discontinuous geometric shapes. In these applications, it is preferred that the planar bodies 16 include highly penetration resistance structures formed from rigid ballistic resistant materials. Preferred geometric shapes of planar bodies 16 will be space filling and will be positioned to provide more than one (preferably at least two, more preferably three and most preferably three) different directions for continuous or semi continuous (preferably continuous) seams where seam directions are preferably at an angle to each other (more preferably at an angle of about 60°) in order to allow flexing in multiple directions as depicted in FIGS. 5 to 8. Such constructions regardless of the thickness and rigidity of planar body 16 can drape around doubly curved surfaces and thus exhibit the desired flexibility. Primarily because of the improved flexibility a preferred construction consists of an arrangement of triangular shaped bodies (preferably right angle triangles, equilateral triangles or a combination thereof and more preferably equilateral triangles) which are arranged to be area filling as depicted in FIGS. 5 to 8 and 14 to 17. A desirable modification to this construction is the inclusion of compatible geometric shapes such as hexagons, parallelograms, trapezoids and the like, which correspond to shapes obtainable by fusion of two or more triangles at appropriate edges. As depicted in FIGS. 7, 8 and 9 to 12 the most compatible geometric shape is a hexagon. It should be noted that while in FIGS. 7 and 8 the hexagonal and triangular shaped bodies are positioned on the same surface of layer 14, such positioning is not critical, and such bodies can be conveniently placed on more than one surface as for example in FIG. 3. Such space filling constructions allow a wide range of compromises between flexibility and minimization of seams and penetration resistance. One or more of the apexes of planar bodies 16 are preferably truncated or rounded which also enhances flexibility by allowing substrate layer 14 to flex away from body 16 between the attachment point and the perimeter. Planar bodies 16 preferably include eyes for stitching planar bodies 20 to a surface of layer 14 by way of stitches. Additional flexibility can be achieved by providing spacers between substrate layer 14 and planar bodies 16. In these preferred embodiments, curvilinear planar bodies 18 such as a circular or oval shaped body 16 (not depicted) are positioned at the truncated or rounded apexes to provide for additional penetration resistance. Alternatively, a mixture of totally or partially truncated planar bodies 16 and partially truncated or untruncated planar bodies 16 can be used in which the open areas at the truncated ends can be covered by the un-truncated ends of the adjacent partially truncated or untruncated planar body 16. Such space filling constructions allow a wide range of compromises between flexibility and minimization of seams, and maximization of penetration resistance.

Figure 5:
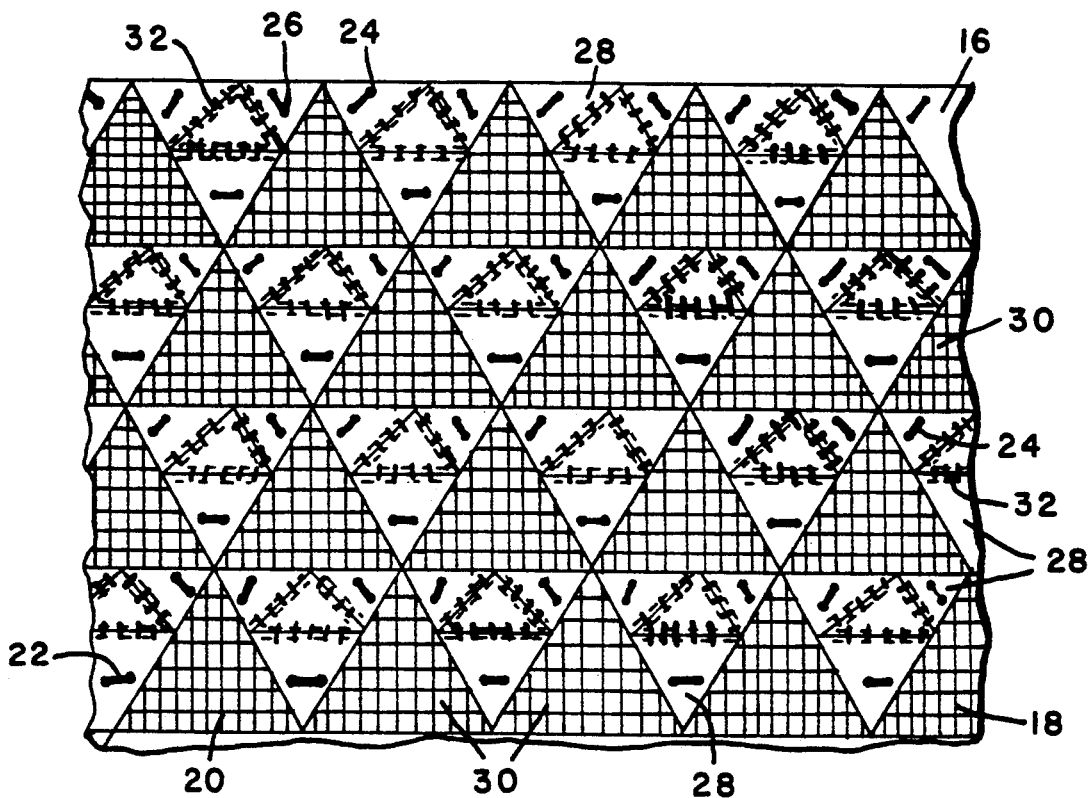
FIG. 5 is a fragmentary frontal view of the body armor of this invention of FIG. 2 in which certain selected layers have been cut away to depict equilateral triangular shaped rigid panels laminated and sewn on both sides of a stitched fabric.

As shown in FIG. 3, 4 and 5 in the preferred embodiments of this invention, article 10 includes a plurality of layers 14 in which rigid substantially planar bodies 16 in adjacent layers 14 are offset to provide for continuous and overlapping rigid ballistic protection.

In these embodiments, as shown in FIG. 4 article 10 preferably includes at least two layers 14 in which each layer 14 is partially covered with planar bodies 16 preferably forming an alternating pattern of covered areas 28 and uncovered areas 30. These layers are positioned in article 18 such that uncovered areas 30 of one layer 14 are aligned with covered areas 28 of another layer 14 (preferably an adjacent layer) providing for partial or complete coverage of the uncovered areas of one layer 14 by the covered areas of an another layer 14. Alternatively, another preferred embodiment as depicted in FIG. 3 includes a layer 14 in which each side of the layer is partially covered with bodies 16 and where the bodies are positioned such that the covered areas 28 on one side of the layer are aligned with the uncovered areas 30 on the other side of the layer. In the preferred embodiments of the invention, the surface of layer 14 s covered with planar bodies 16 such that the bodies are uniformly larger than the uncovered mated surface of the other layers 12 or the other surface of the same layer providing for complete overlap. This is preferably accomplished by truncation of the edges of the bodies 16 or otherwise modification of such edges to allow for closer placement of bodies 16 on the surface such that a covered area is larger than the complementary uncovered area 30. Extensive disalignment between the various fibrous layers 14, is prevented by the securing means 18 and 20.

Planar bodies 16 are comprised of a "rigid" material which may vary widely depending on the uses of article 10. The term "rigid" as used in the present specification and claims is intended to include semi-flexible and semi-rigid structures that are not capable of being free standing, without collapsing which are not flexible when evaluated under Drape Test 1. In those embodiments of the invention where the planar bodies 16 are not intended to provide penetration resistance, as for example a floatation vest, vest for the control of transmission, absorption, reflection, and deflection of electromagnetic radiation, acoustical energy, flames, and fluids, transfer planar bodies 16 may be formed from a material which may be easily penetrated as for example a polymeric foam. On the other hand, if planar bodies 16 are to provide penetration resistance, then penetration resistant materials should be used for at least a part of their structure. In the preferred embodiments of the invention planar bodies 16 are formed from penetration resistant materials. The materials employed in the fabrication of penetration resistant planar bodies 16 may vary widely and may be any penetration resistant inorganic or organic materials. Illustrative of such materials are those described in G. S. Brady and H. R. Clauser, *Materials Handbook*, 12th Ed. (1986). Useful materials include high modulus polymeric materials such as polyamides as for example aramids, nylon-66, nylon-6 and the like; polyesters such as polyethylene terephthalate, polybutylene terephthalate, and the like; acetalo; polysulfones; polyethersulfones, polyacrylates; acrylonitrile/butadiene/styrene copolymers; polymer(amideimide); polycarbonates; polyphenylenesulfides; polyurethanes; polyphenyleneoxides; polyester carbonates polyesterimides; polymidies; polyetherimides; polymides; polyetheretherketone; epoxy resins; phenolic resins; polysulfides; silicones; polyacrylates; polyacrylics; polydienes, vinyl ester resins, modified phenolic resins; unsaturated polyester; allylic resins; alkyd resins, melamine and urea resins; polymer alloys and blends of thermoplastic resins one or more thermosetting resins and combinations one or more thereof; and interpenetrating polymer networks such as those of polycyanate ester of a polyol such as the dicyanoester of bisphenol-A and a thermoplastic such as a polysulfone.

Planar bodies 16 may comprise a network of fibers as for example those described for use in the fabrication of fibrous substrate layer 14 preferably aramid fibers, such as Kevlar ® 29, 49, 129 and 149 aramid fibers, polyethylene fibers, polyethylene fibers such as Spectra ® 900 and Spectra ® 1000 polyethylene fibers and combinations thereof dispersed in a matrix of one or more polymeric materials such as one or more thermoplastic resins one or more thermosetting resins or a combination thereof, such as polymers used to form the fibers of fibrous substrate layers 14. In these embodiments of the invention, the fibers are dispersed in a continuous phase of a matrix material which preferably substantially coats each filament contained in the fiber. The manner in which the filaments are dispersed may vary widely. The filaments may be aligned in a substantially parallel, unidirectional fashion, or filaments may by aligned in a multidirectional fashion with filaments at varying angles with each other. In the preferred embodiments of this invention, filaments in each layer are aligned in a substantially parallel, unidirectional fashion such as in a prepreg, pultruded sheet and the like. One such suitable arrangement is where the polymeric layer comprises a plurality of layers or laminates in which the coated filaments are arranged in a sheet-like array and aligned parallel to another along a common filament direction. Successive layers of such coated, uni-directional filaments can be rotated with respect to the previous layer to form a relatively flexible composite. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments. Techniques for fabricating these laminated structures are described in greater detail in U.S. Pat. Nos. 4,916,000; 4,623,574; 4,748,064; 4,457,985 and 4,403,012.

Useful materials for the fabrication of planar bodies 16 also include multilayered fabric or fibrous composites in which the fabric or fibrous layers are secured by some securing means as for example stitching, adhesive, bolts, staples and the like. These fabrics can be woven or non-woven, and can be formed from the fibers described above for use in the fabrication of fibrous substrate layer 14 such as aramid fibers (such as Kevlar ® 29, 49, 129 and 149 aramid fibers) polyethylene fibers (such as Spectra ® 900 and Spectra ® 1000 polyethylene fibers) and combinations thereof.

Planar bodies 16 may also be formed from metal and non-metal ceramics. Illustrative of useful metal and non-metal ceramics are as those described in C. F. Liable, *Ballistic Materials and Penetration Mechanics*, Chapters 5-7 (1980) and include single oxides such as aluminum oxide ($Al_2O_3$), barium oxide (BaO), beryllium oxide (BeO), calcium oxide (CaO), cerium oxide ($Ce_2O_3$ and $CeO_2$), chromium oxide ($Cr_2O_3$), dysprosium oxide ($Dy_2O_3$), erbium oxide ($Er_2O_3$), europium oxide: (EuO, $Eu_2O_3$, $Eu_2O_4$ and ($Eu_{16}O_{21}$), gadolinium oxide ($Gd_2O_3$), hafnium oxide ($HfO_2$), holmium oxide ($Ho_2O_3$), lanthanum oxide ($La_2O_3$), luetetium oxide ($Lu_2O_3$), magnesium oxide (MgO), neodymium oxide ($Nd_2O_3$), niobium oxide: (NbO, $Nb_2O_3$, and $NbO_2$), $Nb_2O_5$), plutonium oxide: (PuO, $Pu_2O_3$, and $PuO_2$), praseodymium oxide: ($PrO_2$, $Pr_6O_{11}$, and $Pr_2O_3$), promethium oxide ($Pm_2O_3$), samarium oxide (SmO and $Sm_2O_3$), scandium oxide ($Sc_2O_3$), silicon dioxide ($SiO_2$), strontium oxide (SrO), tantalum oxide ($Ta_2O_5$), terbium oxide ($Tb_2O_5$), terbium oxide ($Tb_2O_3$ and $Tb_4O_7$), thorium oxide ($ThO_2$), thulium oxide ($Tm_2O_3$), titanium oxide: (Tio, $Ti_2O_3$, $Ti_3O_5$ and $TiO_2$), uranium oxide ($UO_2$, $U_3O_8$ and $UO_3$), vanadium oxide (VO, $V_2O_3$, $VO_2$ and $V_2O_5$), ytterbium oxide ($Yb_2O_3$), and zirconium oxide ($ZrO_2$). Useful ceramic materials also include boron carbide, zirconium carbide, beryllium carbide, aluminum beride, alluminum carbide, boron carbide, titanium carbide, titanium diboride, iron carbide, iron nitride, barium titanate, aluminum nitride, titanium niobate, boron carbide, silicon boride, barium titanate, silicon nitride, calcium titanate, tantalum carbide, graphites, tungsten; the ceramic alloys which include cordierite/MAS, led zirconate titanate/PLZT, alumina-titanium carbide, alumina-zirconia, zirconia-cordierite/ZrMAS; the fiber reinforced ceramics and ceramic alloys; and glassy ceramics.

Useful materials for fabrication of planar bodies 16 also include metals such as nickel, manganese, tungsten, magnesium, titanium, aluminum and steel plate. Illustrative of useful steels are carbon steels which include mild steels of grades AISI 1005 to AISI 1030, medium-carbon steels of grades AISI 1030 to AISI 1055, high-carbon steels of the grades AISI 1060 to AISI 1095, free-machining steels, low-temperature carbon steels, rail steel, and superplastic steels; high-speed steels such as tungsten steels, molybdenum steels, chromium steels, vanadium steels, and cobalt steels; hot-die steels; low-alloy steels; low-expansion alloys; mold-steel; nitriding steels for example those composed of low-and medium-carbon steels in combination with chromium and aluminum, or nickel, chromium and aluminum; silicon steel such as transformer steel and silicon-manganese steel; ultrahigh-strength steels such as medium-carbon low alloy steels, chromium-molybdenum steel, chromium-nickel-molybdenum steel, iron-chromium-molybdenum-cobalt steel, quenched-and-tempered steels, cold-worked high-carbon steel; and stainless steels such as iron-chromium alloys austenitic steels, and chromium-nickel austenitic stainless steels, and chromium-manganese steel. Useful materials also include alloys such a manganese alloys, such as manganes aluminum alloy, manganese bronze alloy; nickel alloys such as, nickel bronze, nickel cast iron alloy nickel-chromium alloys, nickel-chromium steel alloys, nickel copper alloys, nickel-molybdenum iron alloys, nickel-molybdenum steel alloys, nickel-silver alloys, nickel-steel alloys; iron-chromium-molybdenum-cobalt-steel alloys; magnesium alloys; aluminum alloys such as those of aluminum alloy 1000 series of commercially pure aluminum, aluminum-manganese alloys of aluminum alloy 300 series, aluminum-magnesium-manganese alloys, aluminum-magnesium alloys, aluminum-copper alloys, aluminum-silicon-magnesium alloys of 6000 series, aluminum-copper-chromium of 7000 series, aluminum casting alloys; aluminum brass alloys and aluminum bronze alloys.

Figure 6:
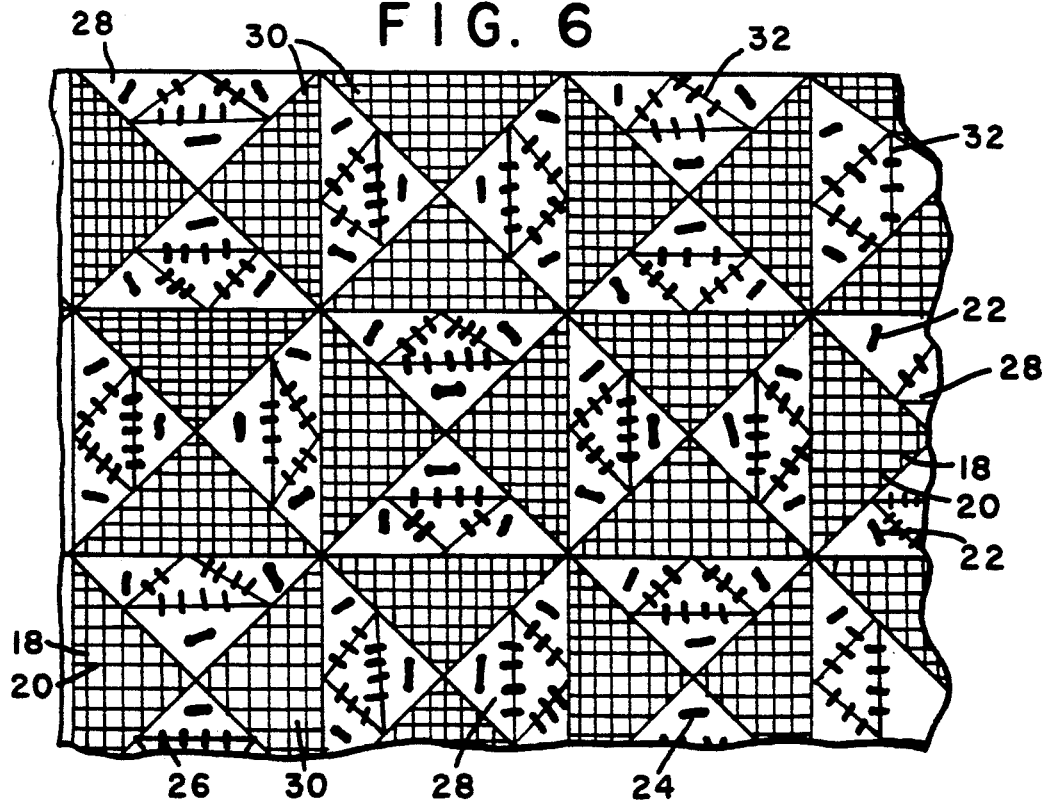
FIG. 6 is a fragmentary frontal view of the body armor of this invention of FIG. 3 in which certain selected layers have been cut away to depict right angle triangular shaped rigid panels laminated and sewn on both sides of a stitched fabric.
Figure 7:
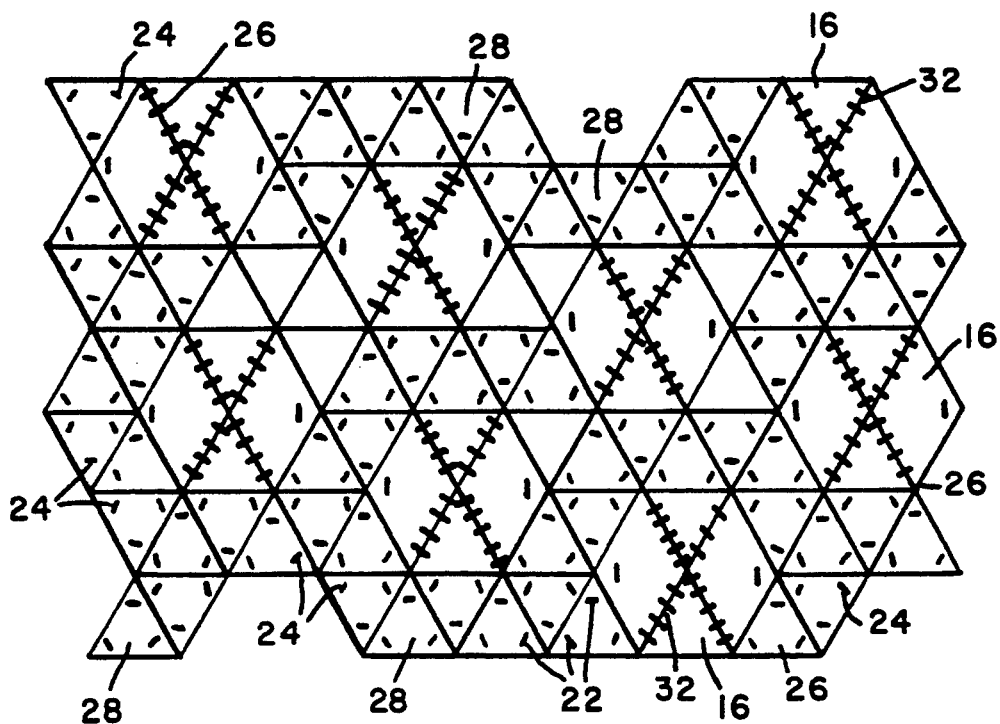
FIG. 7 is an frontal view of an embodiment of this invention having shaped metal panels sewn to a substrate in which the panels are in the shape of equilateral triangles and hexagons.
Figure 8:
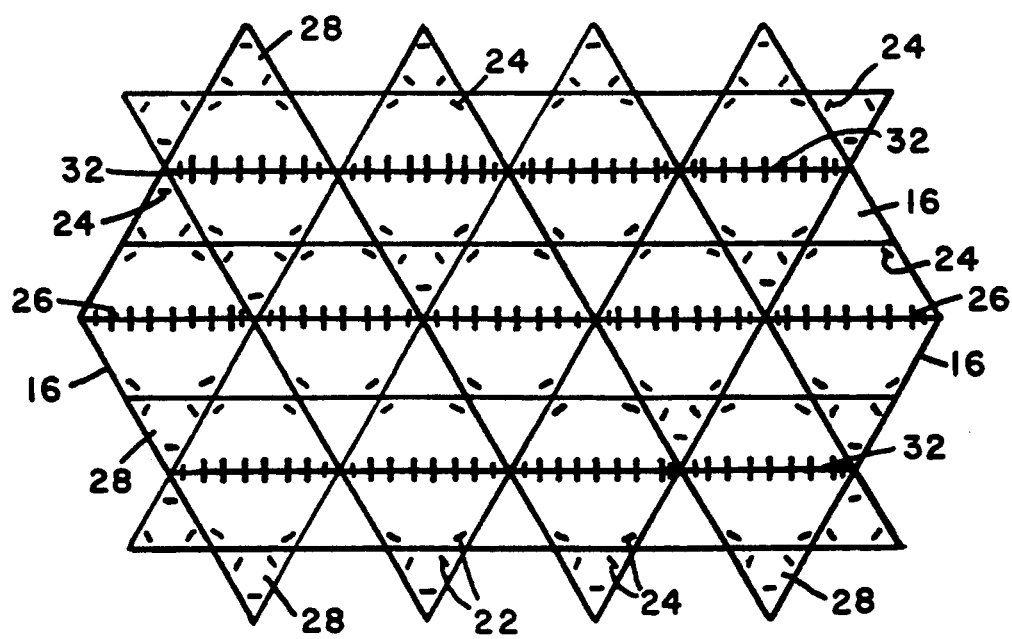
FIG. 8 is a frontal view of another embodiment of this invention having shaped metal panels sewn to a substrate in which the panels are in the shape of equilateral triangles and hexagons.
Figure 9:
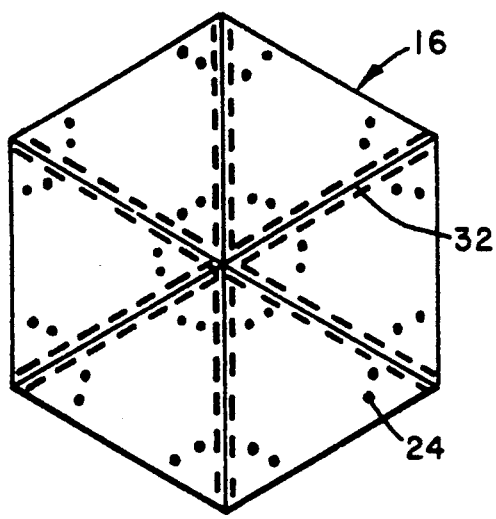
FIGS. 9 to 23 are overhead views of planar bodies for use in the practice of this invention having one or more flexible seams.
Figure 10:
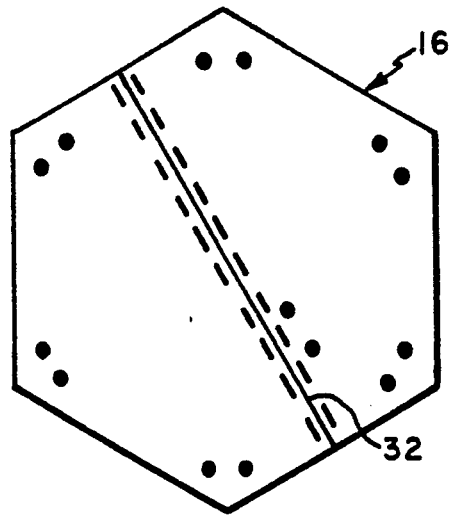
Figure 11:
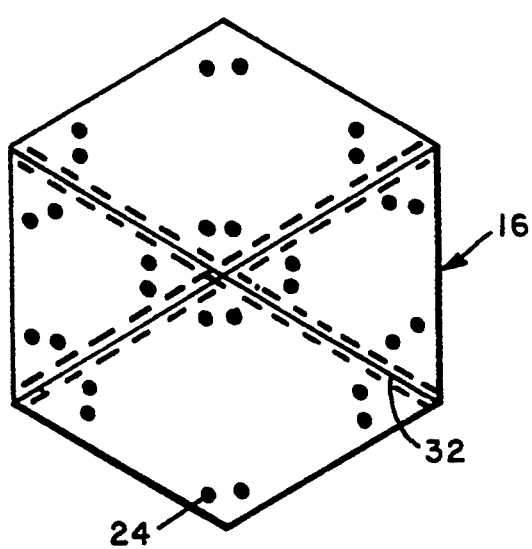

The shape of planar bodies 16 may vary widely. For example, planar bodies 16 may be of regular shapes such as hexagonal, triangular, square, octagonal, trapezoidal, parallelogram and the like, or may be irregular shaped bodies of any shape or form. In the preferred embodiments of this invention, planar bodies 16 are regular shaped bodies, irregularly shaped bodies or combination thereof which completely or substantially completely (at least 90% area) cover the surface of fibrous layer 14. In the more preferred embodiments of the invention, planar bodies 16 are of regular shape (preferably having truncated edges), and in the most preferred embodiments of the invention planar bodies 16 are triangular shaped bodies (preferably right angle triangles, equilateral triangles or a combination thereof and more preferably equilateral triangles) as depicted in FIGS. 5 and 6, or a combination of triangular shaped bodies and hexagon shaped bodies as depicted in FIGS. 7 and 8, which provide for relative improved flexibility relative to ballistic articles having planar bodies 16 of other shapes of equal area.

The number of layers 12 included in article 10 of this invention may vary widely depending on the use of the composite, for example, for those uses where article 10 would be used as ballistic protection, the number of layers 12 would depend on a number of factors including the degree of ballistic protection desired and other factors known to those of skill in the ballistic protection art. In general for this application, the greater the degree of protection desired the greater the number of layers 12 included in article 10 for a given weight of the article. Conversely, the lesser the degree of ballistic protection required, the lesser the number of layers 12 required for a given weight of article 10.

As depicted in the FIGS. 3 and 4, article 10 preferably includes at least two layers 14 in which each layer 14 is partially covered with planar bodies 16, preferably forming an alternating pattern of covered areas 28 and uncovered areas 30. These layers are positioned in article 10 such that uncovered areas 30 of one layer 14 are aligned with covered areas 28 of another layer 14 (preferably an adjacent layer) providing for partial or complete coverage of uncovered areas 30 of one layer 14 by covered areas 28 of another layer 12 and vice versa. Alternatively, another preferred embodiment includes a layer 14 in which each side of the layer is partially covered with bodies 18 where the bodies are positioned such that covered areas 28 on one side of layer 14 are aligned with uncovered areas 30 on the other side of layer 14. In the preferred embodiments of the invention the surface of layer 14 covered with planar body 16 such that the bodies are uniformly larger than uncovered mated areas 30 of the other layer 14 providing for complete overlap. This is preferably accomplished by truncation of the edges of the bodies 18 or otherwise modification of such edges to allow for close placement of the bodies on the surface such that a covered area is larger than the complementary uncovered area.

Figure 12:
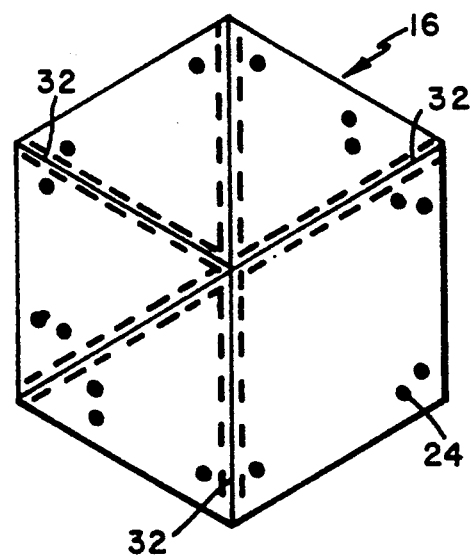
Figure 13:
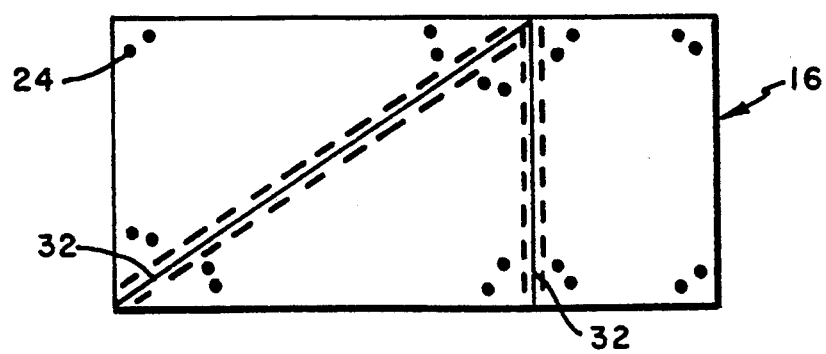
Figure 14:
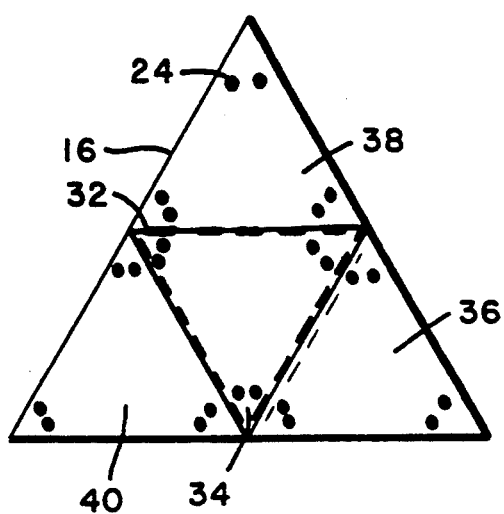
Figure 15:
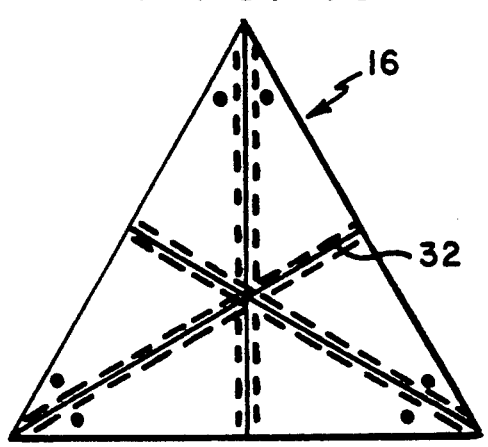
Figure 16:
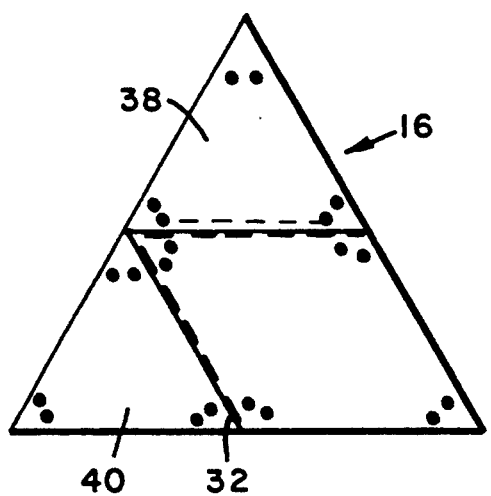
Figure 17:
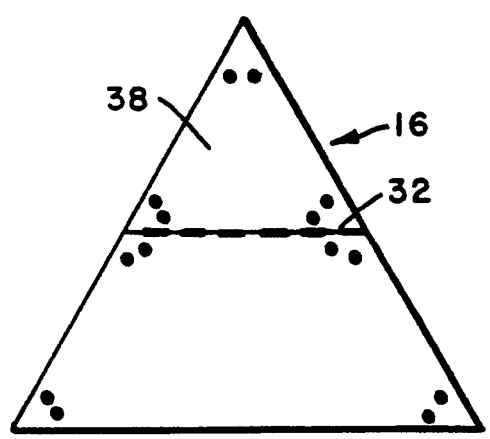
Figure 18:
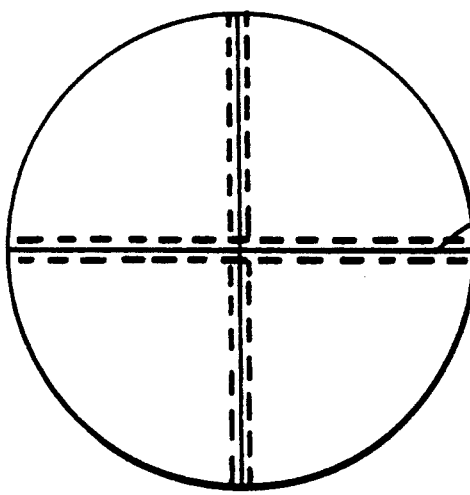
Figure 19:
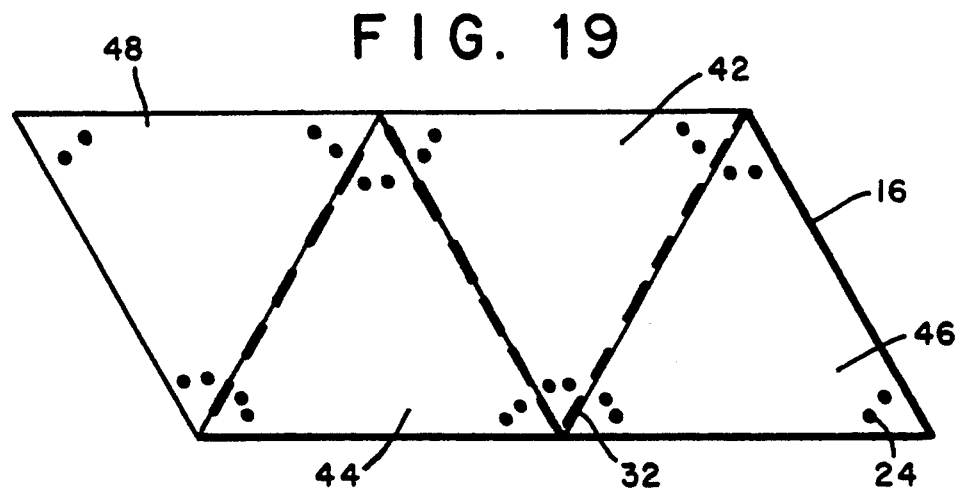
Figure 20:
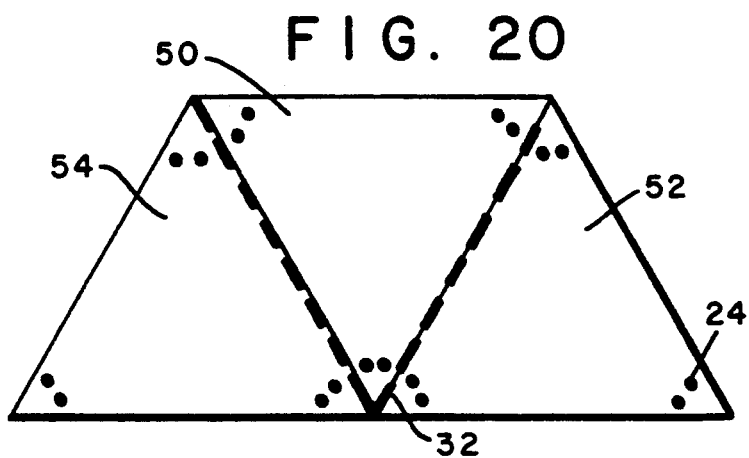
Figure 21:
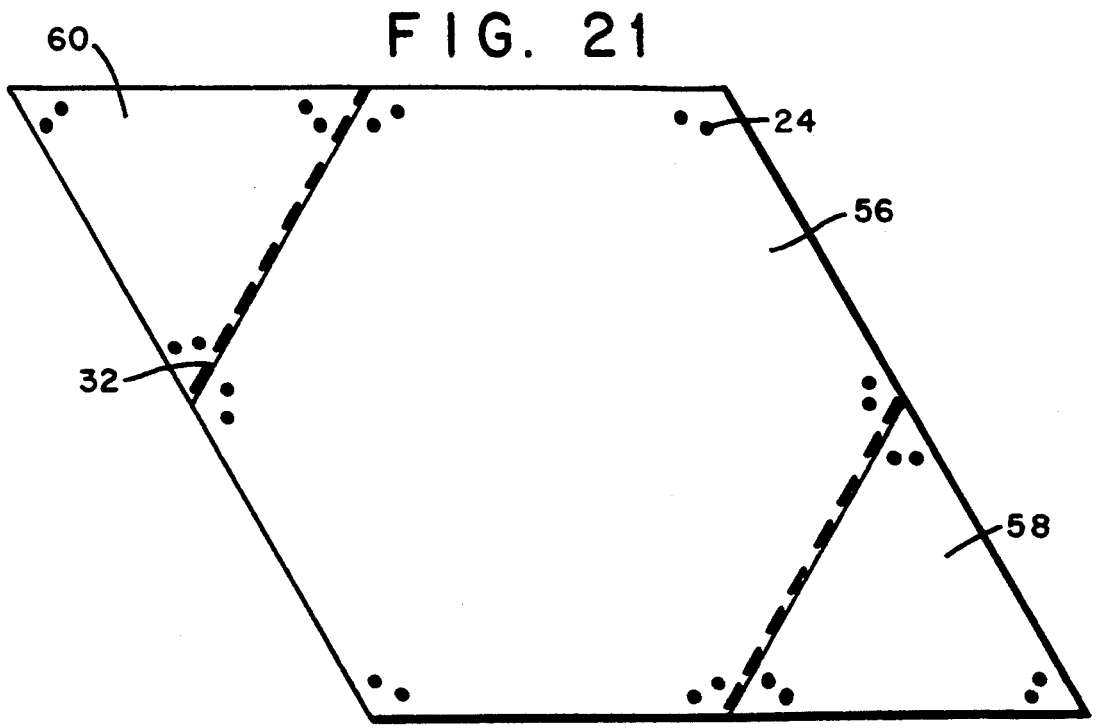

The articles of this invention may be fabricated through use of conventional techniques. For example, bodies 16 may be sewn to layer 12 using conventional sewing techniques, preferably at one or more points of body 16, more preferably a distance from the edge of a body 16 as depicted in FIGS. 4, 5 and 12. By sewing a distance from the edge of body 16 flexibility is enhanced. To prevent extensive disalignment between various layers 12 adjacent layers can be stitched together.

The thread used to stitch bodies 16 to substrate layers 14 can vary widely and depends on the needs of the particular situation. For example, thread may be formed from polymers having relatively high tensile modulus and tensile strength and polymers having relatively low tensile modulus and tensile strength. Thread is preferably a relatively high modulus (equal to or greater than about 200 grams/denier) and a relatively high tenacity (equal to or greater than about 15 grams/denier) fiber. All tensile properties are evaluated by pulling a 10 in. (25.4 cm) fiber length clamped in barrel clamps at 10 in/min (25.4cm/min) on an Instron Tensile Tester. In the preferred embodiments of the invention, the modulus of the fiber is from about 400 to about 3000 grams/denier and the tenacity is from about 20 to about 50 grams/denier, more preferably the modulus is from about 1000 to about 3000 grams/denier and the tenacity is from about 25 to about 50 grams/denier; and most preferably the modulus is from about 1500 to 3000 grams/denier and the tenacity is from about 30 to about 50 grams/denier. Useful threads and fibers may vary widely and include those described herein below in the discussion of fiber for use in the fabrication of substrate layers 12. However, the thread or fiber used in stitching means is preferably an aramid fiber or thread (as for example Kevlar ® 29, 49, 129 and 141 aramid fiber), an extended chain polyethylene thread or fiber (as for example Spectra 900 fiber and Spectra ® 1000 polyethylene fiber) or a mixture thereof.

The composites of this invention can be used for conventional purposes. For example, such composites can be used in used in any construction where flexibility is required, and where areal coverage by rigid bodies is required to provide a desirable benefit but are not flexible enough to be used as a single sheet. Such application include composites for control of transmission, absorption, reflection, and deflection of electromagnetic radiation( i.e. radio, infrared, visible, UV, X-ray and the like), acoustical energy, flames, fluids (i.e. gases and liquids), and solids. Other uses of the composite of this invention are in the fabrication of flexible insulating materials such as blankets, clothing, sleeping bags, tarps, tents, personal floatation gear, and the like; backing material to reduce blunt trauma from impact with hard objects such as bullets, baseballs, hockey pucks and the like; vehicle panelling and the like; and protective apparel and equipment such as that for protection against wild animals, protection for motorcyclists and for personnel working with dangerous equipment( i.e. meat cutters, timber cutters and the like ),blankets for moving furniture, wet suits for scuba divers, bomb blankets ;and the like. Still other applications include use in accessorizing clothing for example designs for changing the visibility of the wearer.

In the preferred embodiments of the invention, the composites are used in the fabrication of penetration resistant articles of manufacture. Such penetration resistant articles include meat cutter aprons, protective gloves, boots, tents, fishing gear and the like.

The composites of this invention are particularly useful as a "bulletproof" vest material or ballistic resistant articles such as "bulletproof" lining for example, or a raincoat because of the flexibility of the article and its enhanced ballistic resistance.

In ballistic studies, the specific weight of the shells and plates can be expressed in terms of the areal density (ADT). This areal density corresponds to the weight per unit area of the ballistic resistant armor. In the case of filament reinforced composites, the ballistic resistance of which depends mostly on filaments, another useful weight characteristic is the filament areal density of the composite. This term corresponds to the weight of the filament reinforcement per unit area of the composite (AD).

The following examples are presented to provide a more complete understanding of the invention and are not to be construed as limitations thereon.

EXAMPLE 1

A. General Procedure

I. Composite Panel Preparation

Figure 26A:
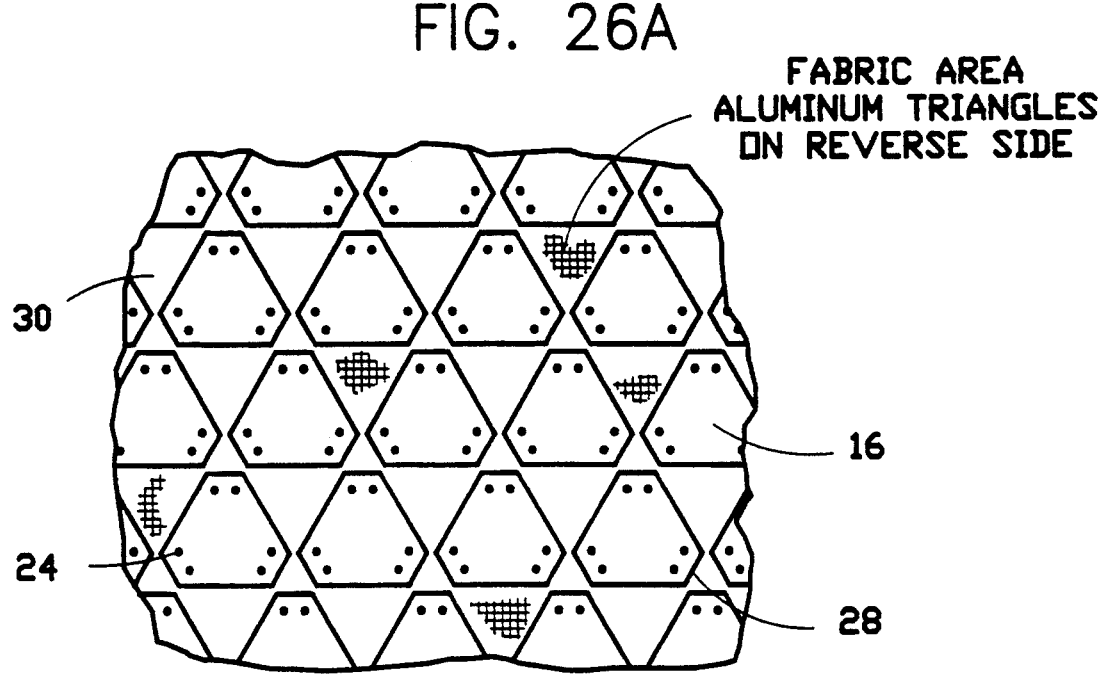
FIG. 26 is an overhead view of the arrangement of rigid triangular bodies on the impact side and on the opposite side of the composite panels used in EXAMPLE 1.
Figure 26B:
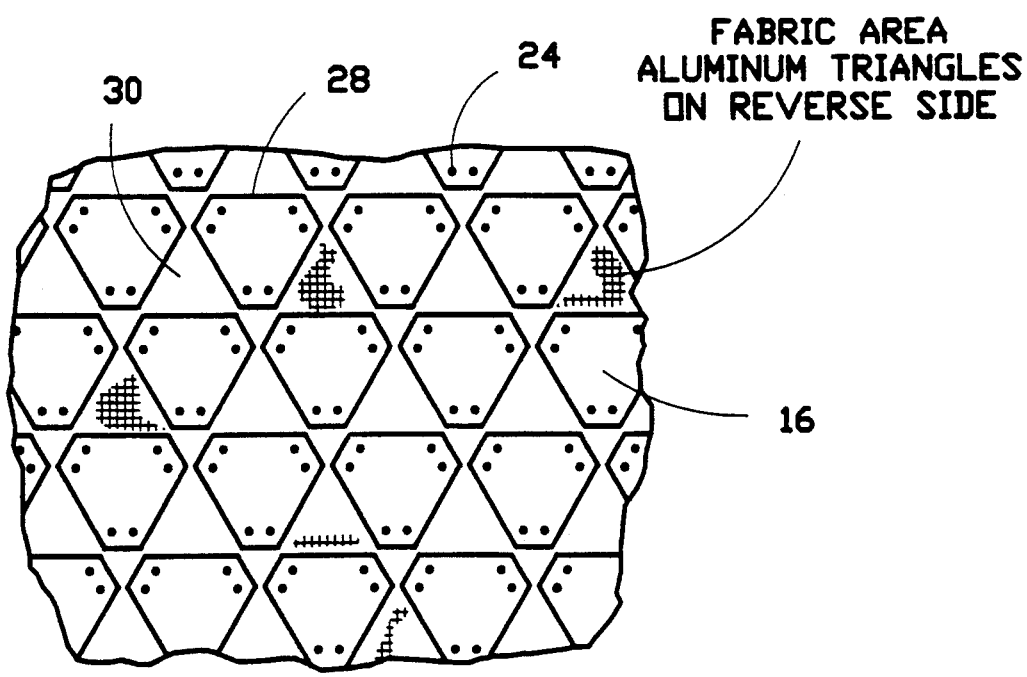

The metal-fabric composite panels were 15 inches (38 cm) square and prepared by sewing the appropriate equilateral triangular 0.05 inch (0.127 cm) thick aluminum assemblies onto a five layer fabric panel. A plain weave ballistic nylon fabric (style 000-26042 from Burlington Industries), having 33×33 yarns per inch (13×13 yarns/cm) and layer areal density of 0.27 km/m$^3$) was marked with an equilateral triangular grid having 3 inch (7.6 cm) side length. For all triangular assemblies, originally having side lengths of 3 inches, (7.6 cm) small triangles were cut off the aluminum metal apexes corresponding to the grid apexes (the height of these small triangles was 0.2 inches (0.51 cm)). The triangular assemblies were sewn onto the fabric panels through eyes 24 in the pattern shown in FIG. 26, with one half of the triangles on each side of the fabric panel.

Elastomeric thread was used to hold metal sub-units together as required. SPECTRA ® 1000 sewing thread was used to affix the triangular assembly onto the fabric layers.

B. Composite Panels

1. SAMPLE 1

Figure 30:
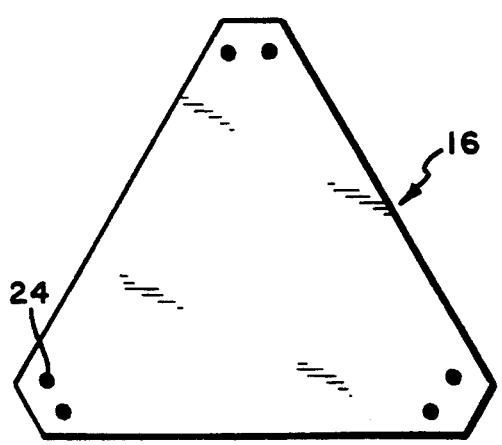
FIG. 30 is an overhead view of the triangular bodies used in SAMPLE 1 of EXAMPLE 1.

This sample consisted of an assembly of unhinged aluminum triangles 16 as shown in FIG. 30. This construction provides three sets of parallel seams along which the hybrid panel can flex with seam distance being 2.6 inches (6.6 cm).

2. SAMPLE 2

Figure 29:
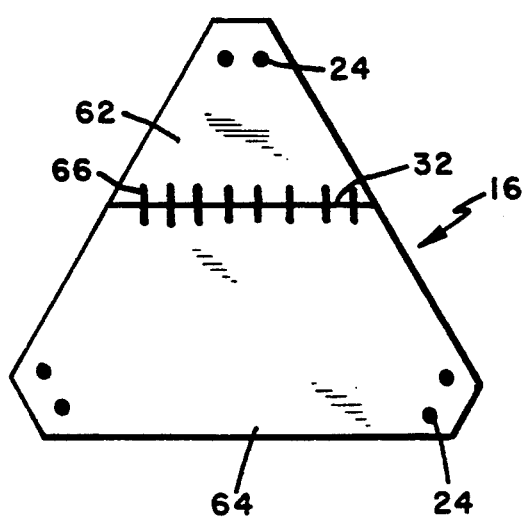
FIG. 29 is an overhead view of the triangular bodies used in SAMPLE 2 of EXAMPLE 1.

This sample consisted of an assembly of aluminum triangles 16 having one hinge 32 per triangle 16, as shown in FIG. 29, which hinge is formed by tying triangular sub-unit 62 and trapezoidal sub-unit 64 together by elastomeric thread 66. This construction provides three sets of parallel seams distances in two directions being 2.6 inches (6.6 cm) in one direction and in the other direction being 1.3 inches (3.3 cm).

3. SAMPLE 3

Figure 28:
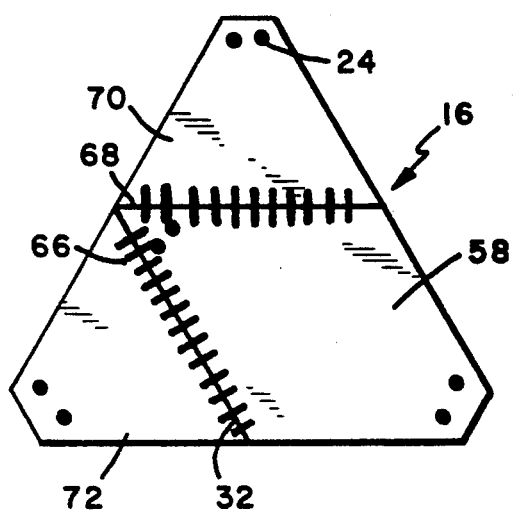
FIG. 28 is an overhead view of the triangular bodies used in SAMPLE 3 of EXAMPLE 1.

This sample consisted of an assembly of aluminum triangles 16 having two hinges 32 and 68 per triangle, as shown in FIG. 28, which hinges are formed by tying triangular sub-units 70 and 72 and parallelgram sub-unit 58 together by elastomeric thread 66.

4. SAMPLE 4

Figure 27:
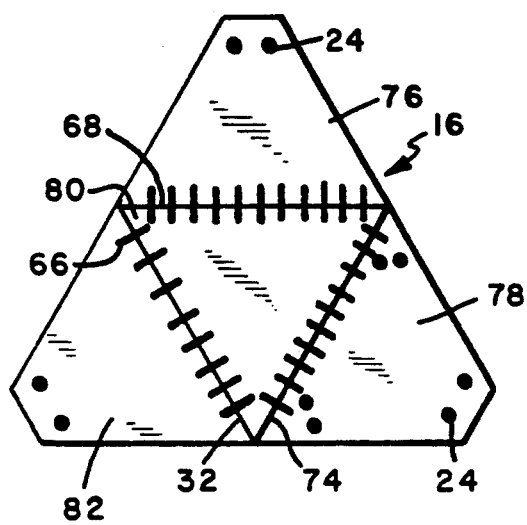
FIG. 27 is an overhead view of the triangular bodies used in SAMPLE 4 of EXAMPLE 1.

This sample consisted of an assembly of aluminum triangles 16 having three hinges 32, 68 and 74 per triangle 16, as shown in FIG. 27 which hinges are formed by tying triangular sub-units 76, 78, 80 and 82 together by elastomeric thread 66. This construction provides three sets of parallel seams along which the hybrid panel can easily flex with seam distance in all three directions being 1.3 inches (3.3 cm).

II. FLEXIBILITY EVALUATION

The flexibility of SAMPLES 1 to 4 was judged in three different directions using the procedure of Drape Test 3 by determining if the panel can be wrapped around a cylinder having an outside diameter of 3 inches (7.6 cm). The results, summarized in Table 1, indicate control of flexibility which can be achieved by varying the number of hinges.

TABLE 1

| FLEXIBILITY OF PANELS WITH ALUMINUM PLATE SEWN ONTO FABRIC DRAPE TEST 1 | | | | |
| --- | --- | --- | --- | --- |
| SAMPLE NO. | NO. OF HINGES | 0° | 60° | 120° |
| 1 | 0 | NO | NO | NO |
| 2 | 1 | YES | NO | NO |

TABLE 1-continued

FLEXIBILITY OF PANELS WITH ALUMINUM PLATE SEWN ONTO FABRIC DRAPE TEST 1

| SAMPLE NO. | NO. OF HINGES | 0° | 60° | 120° |
|---|---|---|---|---|
| 3 | 2 | NO | YES | YES |
| 4 | 3 | YES | YES | YES |

EXAMPLE 2

The flexibility of the composite of this invention having hinged triangular bodies was evaluated using the procedures of Drape Test 1 and Drape Test 2 in comparison with other composites. The composites selected for evaluation were composite SAMPLE 5 which had unhinged triangular bodies of FIG. 30 on the same side of the fabric layer, and composite SAMPLE 6 which was essentially identical to SAMPLE 5, except that hinged triangular bodies depicted in FIG. 27 were used. SAMPLES 5 and 6 were constructed like SAMPLES 1 and 4, respectively, except that all metal triangles were attached to on side of the fabric.

The results are set forth in the following the Tables 2 and 3.

TABLE 2

FLEXIBILITY OF PANELS WITH ALUMINUM PLATES SEWN ONTO FABRIC, DRAPE TEST NO. 2

| SAMPLE NO. | METAL PLATE POS. | H/L AT DIFFERENT ORIENTATIONS | | | | |
|---|---|---|---|---|---|---|
| | | 0° | 30° | 45° | 60° | 90° |
| 1. SAMPLE 6 | TOP | 0.91 | 0.90 | 0.91 | 0.93 | 0.86 |
| | BOTTOM | 0.80 | 0.75 | 0.77 | 0.84 | 0.70 |
| 2. SAMPLE 5 | TOP | 0.95 | 0.95 | 0.96 | 0.96 | 0.95 |
| | BOTTOM | 0.90 | 0.88 | 0.85 | 0.94 | 0.87 |

TABLE 3

FLEXIBILITY OF PANELS WITH ALUMINUM PLATES SEWN ONTO FABRIC, DRAPE TEST NO. 2

| SAMPLE NO. | METAL PLATE POSITION | H/L |
|---|---|---|
| 1. Sample 6 | Top | 0.33 |
| | Bottom | 0.23 |
| 2. Sample 5 | Top | 0.85 |
| | Bottom | 0.48 |

EXAMPLE 3

Two 14 inch (35.6 cm) square panels were prepared by sewing 3 inch (7.6 cm) square hinged assemblies of 0.05 inch (0.127 cm) thick aluminum plates between two Nylon fabric layers (Burlingston Industries, Style 00-26042, 33×33 yarns per inch (13×13 yarns/cm), AD=0.27 kg/m²). Both panels consisted of 16 hinged assemblies sewn between the two fabric layers in a square area filling pattern. The hinged assembly incorporated into panel 1 consistent of four 1.5 inch (3.8) squares aluminum plate hinged together using an adhesive tape. The hinged assembly for Panel 2 were prepared in the same manner except four right angle isosceles triangles having hypotenuse length of 3 inches (7.6 cm) were assembled to create the 3 inch (7.6 cm) square assembly.

Figure 31:
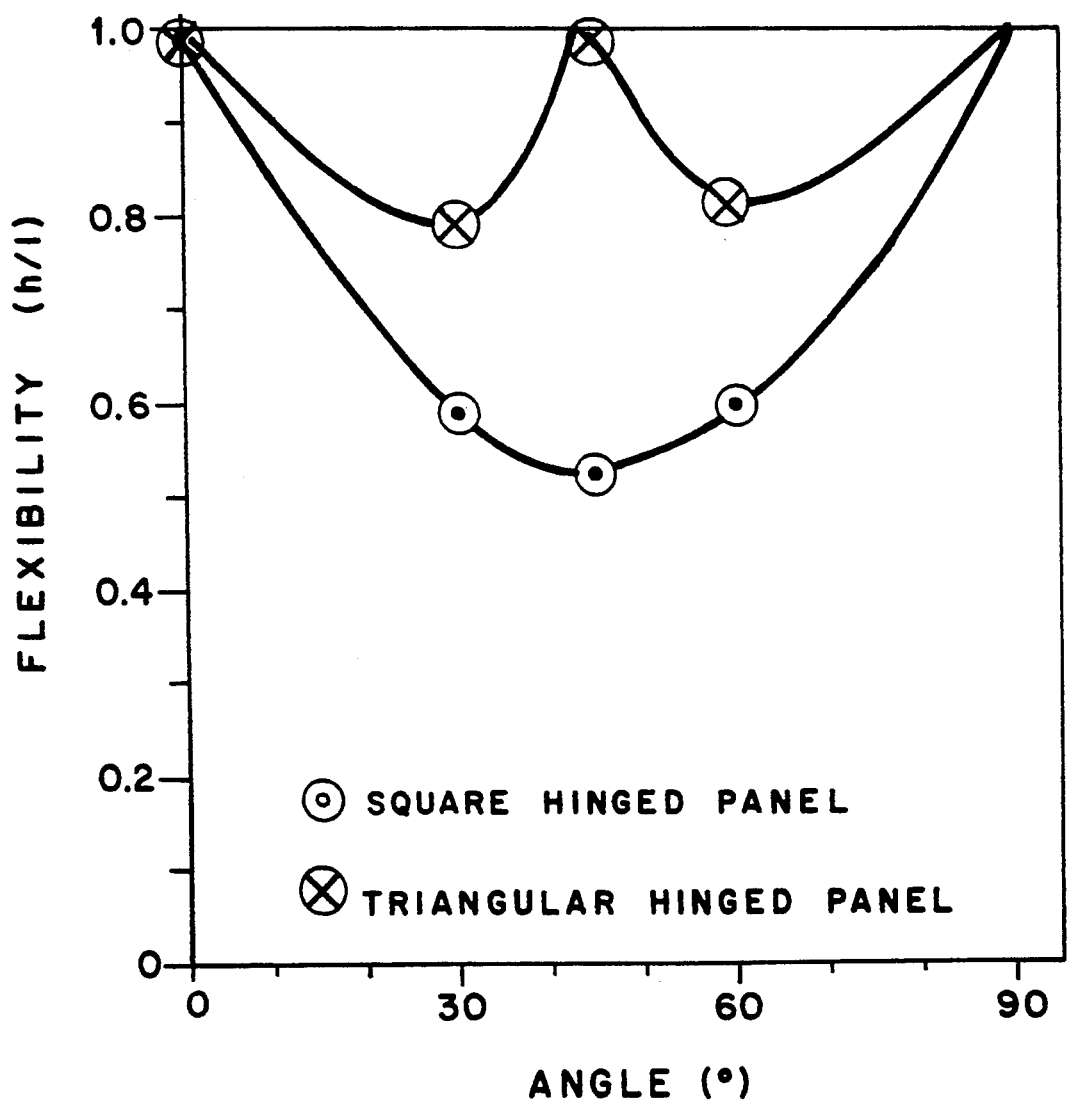
FIG. 31 is a graph of composite data from Drape Test 1 as a function of composite orientation during the test for Panels 1 and 2 of EXAMPLE 3.

The flexibility of these two panels was determined using Drape Test 1. The results, given in Table 4 and shown in FIG. 31.

TABLE 4

FLEXIBILITY OF HINGED ASSEMBLIES

| ANGLE (degrees) | RATIO H/L | |
|---|---|---|
| | Panel 1 | Panel 2 |
| 0 | 0.99 | 1.0 |
| 30 | 0.58 | 0.78 |
| 45 | 0.51 | 0.99 |
| 60 | 0.59 | 0.81 |
| 90 | 0.99 | 1.0 |

The results illustrate that a much more flexible structure is achieved using the structure based on the triangular aluminum plates compared to the structure based on the aluminum squares. Note that the hinged assemblies which were sewn between the two fabric layers were identical in size and that the only difference was the shape of the individual plates used to create the assemblies.

What is claimed is:

1. A flexible composite comprising one or more layers each of which comprises a flexible substrate layer having a plurality of penetration resistant planar bodies affixed to a surface thereof, said bodies having one or more flexible seams which allow one or more portions of said body to flex along said seams, wherein said bodies are positioned such that said at least one seam of a body is aligned or substantially aligned with a seam of at least one adjacent body to form a combination of continuous or semi continuous seams along which said composite may flex.

2. A composite as recited in claim 1 wherein said body comprises at least two non-parallel seams which are at an angle, said bodies positioned on said substrate layer such that at least one parallel seam of all or substantially all adjacent bodies are in alignment or substantially in alignment forming two or more continuous or semi continuous seam combinations which are at an angle which said composite can flex.

3. A composite as recited in claim 2 wherein seam directions are at an angle of about 60°.

4. A composite as recited in claim 2 wherein said bodies as sub divided by said flexible means into one or more triangular shaped portions, or a combination of trapizoidal shaped portions, parallogram shaped portions, hexagonal shaped portions or a combination thereof.

5. A composite as recited in claim 4 wherein said bodies are sub-divided into triangular shaped portions or a combination or hexagonal and triangular shaped portions.

6. A composite as recited in claim 5 wherein said bodies comprises at least three non-parallel seams which are at an angle, said bodies positioned on said substrate layer such that at least one parallel seam of a body is in alignment or substantially in alignment with at least on parallel seam of an adjacent body to form at least three continuous or semi-continuous seam combinations along which said composite can flex.

7. A composite as recited in claim 6 wherein said triangular shaped portions are of equilateral triangular shape or substantially of equilateral triangular shape.

8. A composite as recited in claim 6 wherein all or substantially all of said seam combination are continuous.

9. A composite as recited in claim 6 wherein said bodies are sub-divided into triangular shaped portions.

10. A composite as recited in claim 6 wherein said bodies are sub-divided into a combination of hexagonal and triangular shaped portions.

11. A composite as recited in claim 9 wherein said triangular shaped portions are of equilateral triangular sharp or substantially equilateral triangular shape more continuous or substantially equilateral triangular shape.

12. A composite as recited in claim 1 wherein said substrate layer is a fibrous layer comprising a network of high strength fibers having a tensile strength of at least about 7 grams/denier, a tensile modulus of at least about 160 grams/denier and an energy-to-break of at least about 30 joules/grams.

13. A composite as recited in claim 12, wherein the filaments have a tenacity equal to or greater than about 10 g/d, a tensile modulus equal to or greater than about 150 g/d and an energy-to-break equal to or greater than about 10 j/g.

14. A composite as recited in claim 13, wherein said tenacity is equal to or greater than about 20 g/d, said modulus is equal to or greater than about 500 g/d, and said energy-to-break is equal to or greater than about 5 j/g.

15. A composite as recited in claim 14 wherein said tenacity is equal to or greater than about 25 g/d, said modulus is equal to or greater than about 1000 g/d, and said energy-to-break is equal to or greater than about 20 j/g.

16. A composite as recited in claim 15 wherein said tenacity is equal to or greater than about 30 g/d, said modulus is equal to or greater than about 1300 9/d, and said energy-to-break is equal to or greater than about 30 j/g.

17. A composite as recited in claim 1 wherein said fibers are polyethylene fibers, glass fibers, aramid fibers, nylon fibers or mixtures thereof.

18. A composite as recited in claim 17 wherein said fibers are polyethylene fibers.

19. A composite as recited in claim 17 wherein said fibers are aramid fibers.

20. A composite as recited in claim 17 wherein said fibers are a combination of polyethylene fibers and aramid fibers.

21. A composite as recited in claim 1 wherein said substrate layer comprises at least one sheet-like fibers array in which said fibers are arranged substantially parallel to one another along a common fiber direction.

22. A composite as recited in claim 21 wherein said substrate layer comprises more than one array, with adjacent arrays aligned at an angle with respect to the common fiber direction of the parallel fibers contained in said adjacent array.

23. A composite as recited in claim 22 wherein said angle is from about 45° to about 90°.

24. A composite as recited in claim 23 wherein said angle is about 90°.

25. A composite as recited in claim 1 wherein said substrate layer comprises a non-woven fabric.

26. A composite as recited in claim 1 wherein said subs layer comprises a woven fabric.

27. A composite as recited in claim 1 wherein said substrate layer comprises fibrous network in a polymer matrix.

28. A composite as recited in claim 25 wherein said fibrous network comprises a sheet-like fiber array in which said fibers are arranged substantially parallel to one another along a common fiber direction.

29. A composite as recited in claim 26 wherein said network comprises a plurality of sheet-like fiber arrays in which adjacent arrays are aligned at an angle with respect to the common fiber direction in said adjacent arrays.

30. A composite as recited in claim 27 wherein said angle is from about 45° to about 90°.

31. A composite as recited in claim 28 wherein said angle is about 90°.

32. A composite as recited in claim 1 wherein all or a portion of the apexes of said planar bodies are truncated.

33. A composite as recited in claim 1 wherein the point or points of affixation are spaced from the boundary of said bodies.

34. A composite as recited in claim 1 wherein said bodies are sewn to said substrate layer.

35. A composite as recited in claim 1 which comprises a first and second composite layers, each of which comprises a flexible substrate layer having a surface which is partially covered by a plurality of planar metallic bodies forming a pattern of covered and uncovered areas, said first and second composite layers positioned such that the uncovered areas of the surface of one layer are in correspondence and alignment with the covered areas of the surface of the other layer.

36. A composite as recited in claim 35 wherein said first and second layers are adjacent.

37. A composite as recited in claim 35 wherein the uncovered areas of the surface of a layer are uniformly smaller than the corresponding covered areas of the other layer.

38. A composite as recited in claim 4 wherein said triangular shaped bodies are in the shape of or substantially in the shape of right angle triangles, equilateral triangles or combinations thereof.

39. A composite as recited in claim 37 wherein said bodies are subdivided into hexagons and triangles.

40. A composite as recited in claim 38 wherein said bodies are subdivided into one hexagon and two triangles.

41. An article of manufacture fabricated totally or in part from the composite of claim 1.

* * * * *

UNITED STATES PATENT AND TRADEMARK OFFICE
CERTIFICATE OF CORRECTION

PATENT NO. : 5,316,820
DATED : May 31, 1994
INVENTOR(S) : HARPELL ET AL.

It is certified that error appears in the above-identified patent and that said Letters Patent is hereby corrected as shown below:

Col. 26, line 43, "means" should read --seams--;
Col. 27, line 6, "sharp" should read --shape--;
Col. 27, line 24, "5 j/g" should read --15 j/g--;
Col. 27, line 33, "9/d" should read --g/d--;
Col. 28, line 6, "subs" should read --substrate--.

Signed and Sealed this

Thirtieth Day of August, 1994

Attest:

BRUCE LEHMAN

Attesting Officer

Commissioner of Patents and Trademarks